Feb. 21, 1961   F. R. MARQUARDT   2,972,286
RAPID FIRE GUN WITH TWO BARRELS AND
A PLURALITY OF FIRING CHAMBERS
Filed April 18, 1950   21 Sheets-Sheet 1

INVENTOR
FRANK R. MARQUARDT
BY
ATTORNEYS

Feb. 21, 1961 F. R. MARQUARDT 2,972,286
RAPID FIRE GUN WITH TWO BARRELS AND
A PLURALITY OF FIRING CHAMBERS
Filed April 18, 1950 21 Sheets-Sheet 3

INVENTOR
FRANK R. MARQUARDT
BY
ATTORNEYS

INVENTOR
FRANK R. MARQUARDT

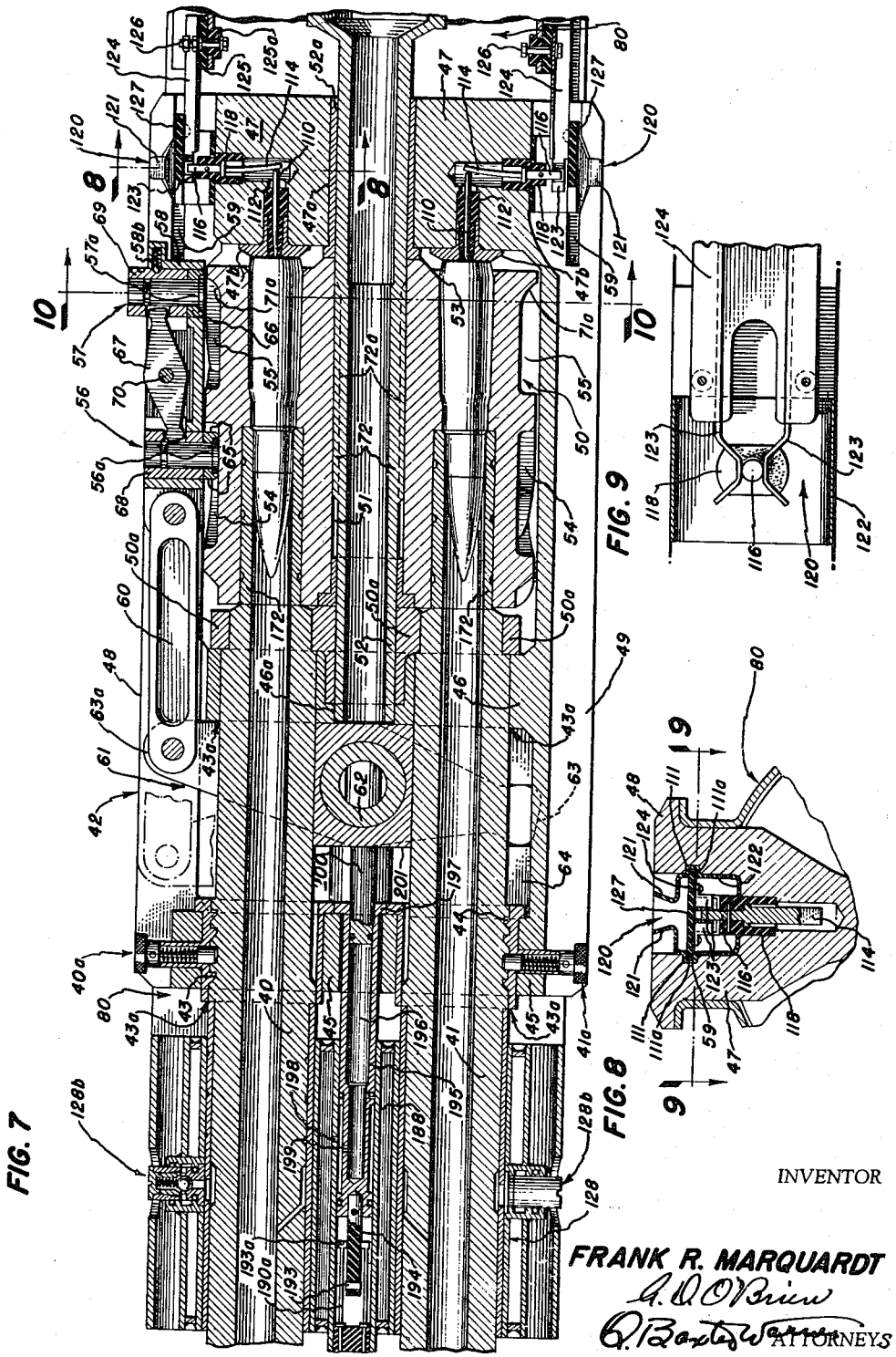

Feb. 21, 1961

F. R. MARQUARDT 2,972,286

RAPID FIRE GUN WITH TWO BARRELS AND
A PLURALITY OF FIRING CHAMBERS

Filed April 18, 1950

INVENTOR
FRANK R. MARQUARDT
BY
ATTORNEYS

Feb. 21, 1961

F. R. MARQUARDT 2,972,286

RAPID FIRE GUN WITH TWO BARRELS AND
A PLURALITY OF FIRING CHAMBERS

Filed April 18, 1950

INVENTOR
FRANK R. MARQUARDT
BY
ATTORNEYS

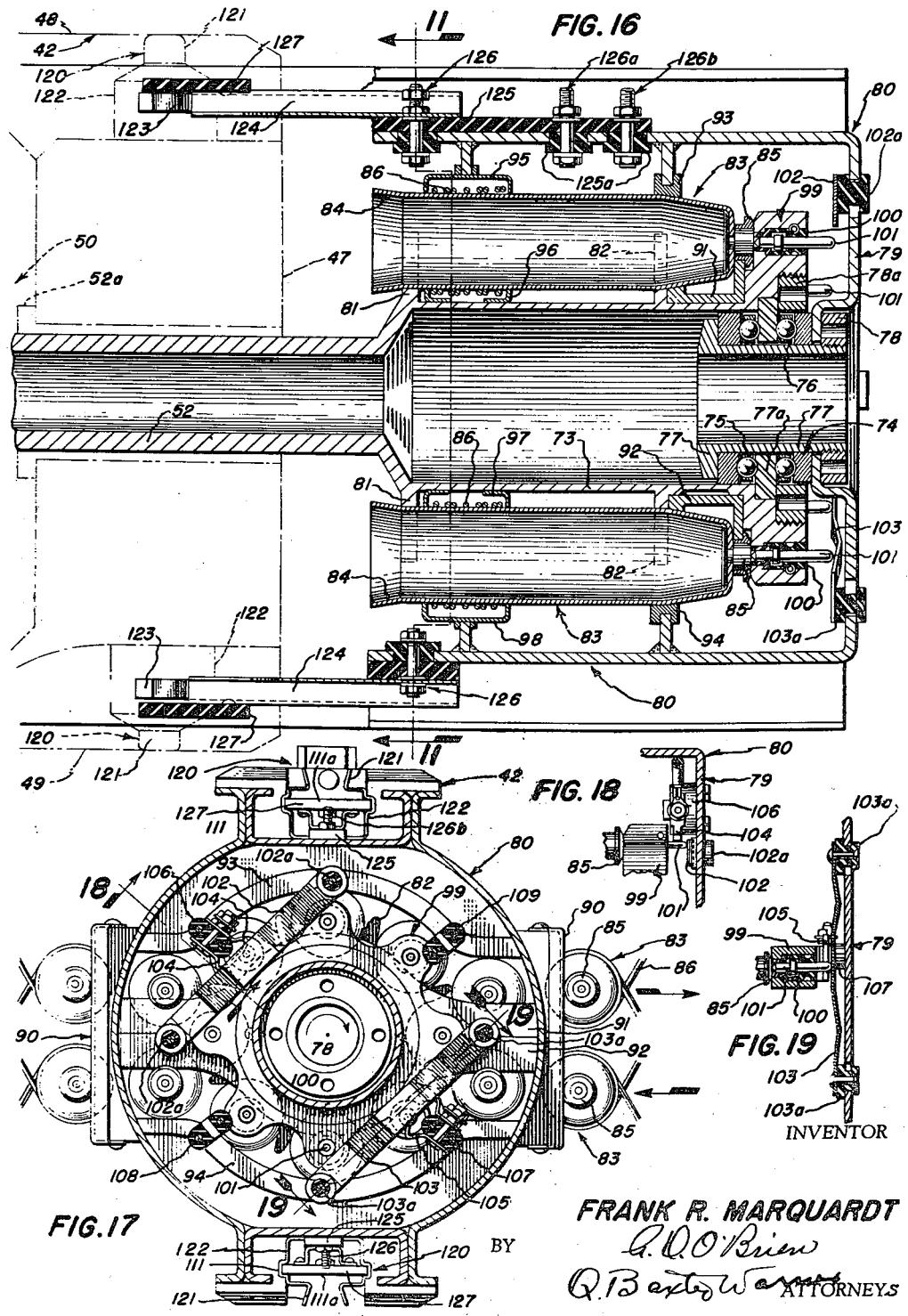

Feb. 21, 1961 F. R. MARQUARDT 2,972,286
RAPID FIRE GUN WITH TWO BARRELS AND
A PLURALITY OF FIRING CHAMBERS
Filed April 18, 1950 21 Sheets-Sheet 10
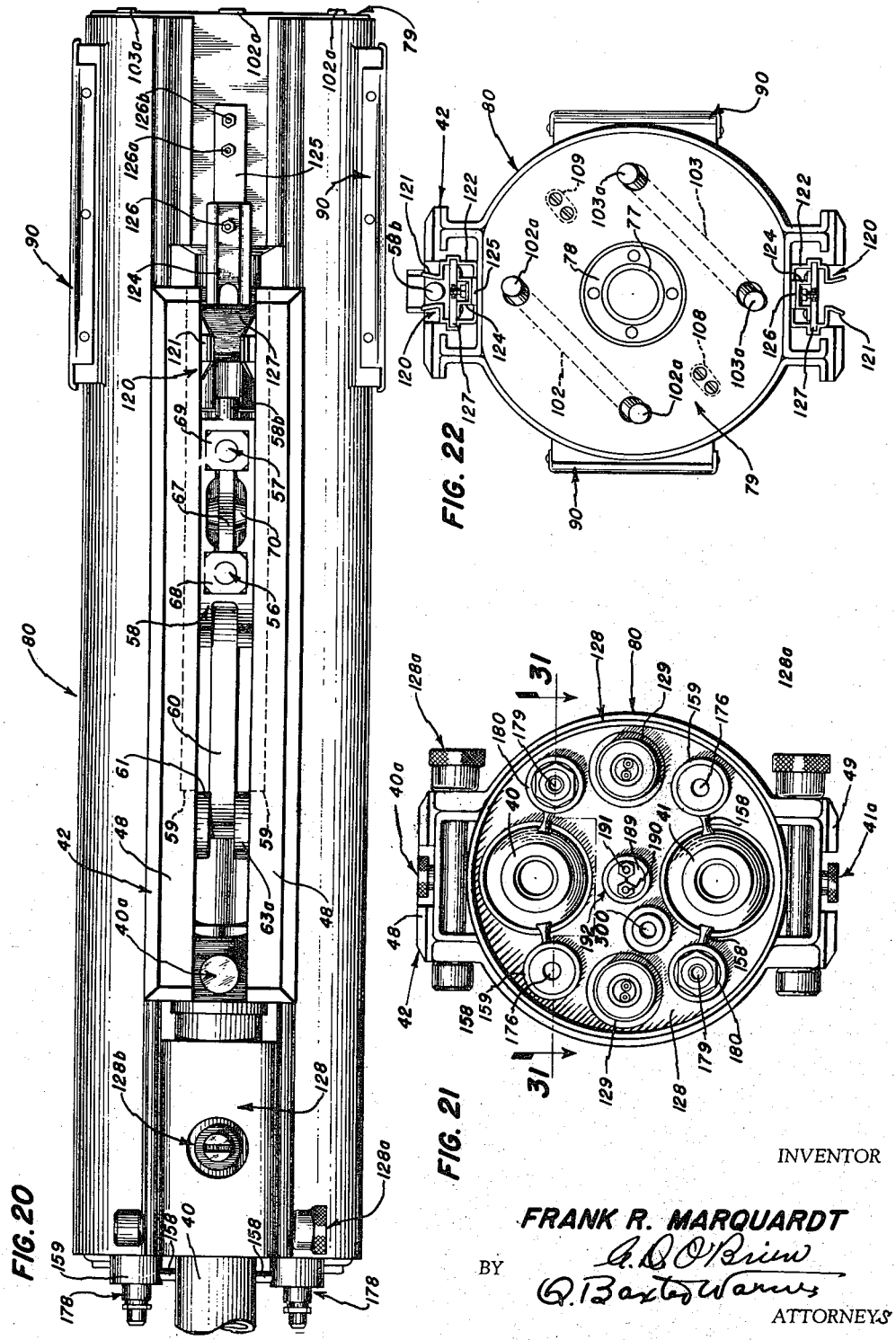
INVENTOR
FRANK R. MARQUARDT
BY
ATTORNEYS

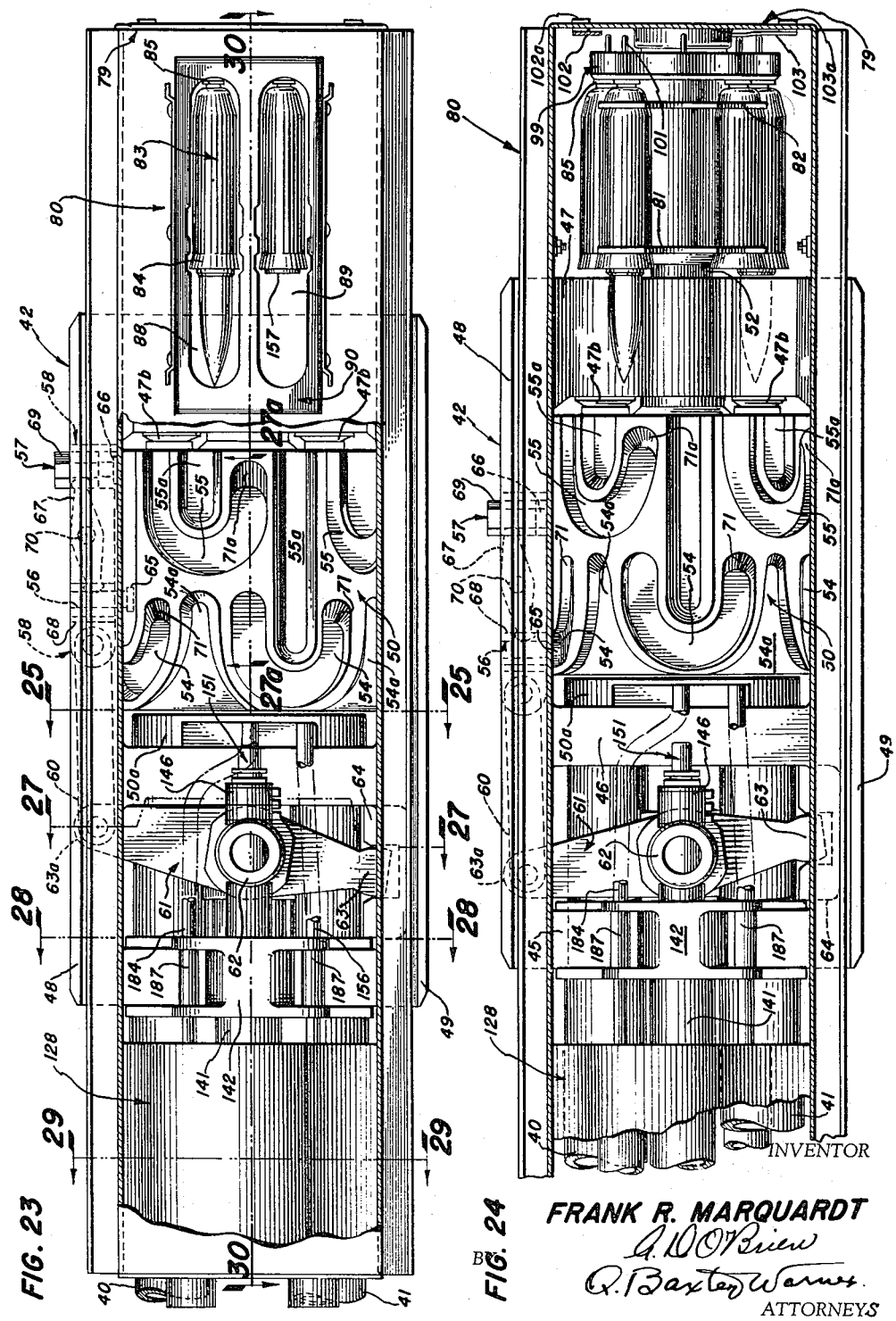

Feb. 21, 1961 F. R. MARQUARDT 2,972,286
RAPID FIRE GUN WITH TWO BARRELS AND
A PLURALITY OF FIRING CHAMBERS
Filed April 18, 1950 21 Sheets-Sheet 12
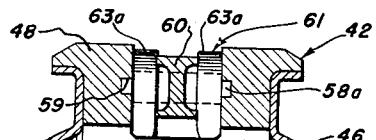
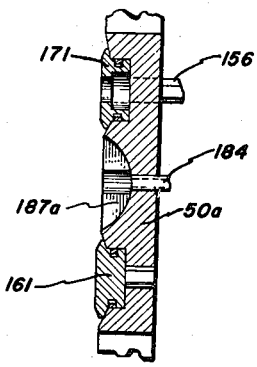
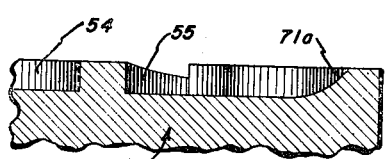
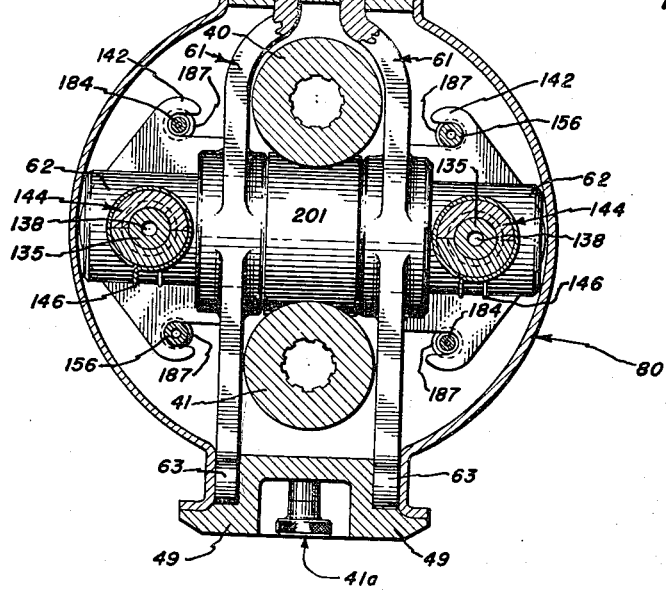
INVENTOR
FRANK R. MARQUARDT
BY
ATTORNEYS Feb. 21, 1961 F. R. MARQUARDT 2,972,286
RAPID FIRE GUN WITH TWO BARRELS AND
A PLURALITY OF FIRING CHAMBERS
Filed April 18, 1950 21 Sheets-Sheet 13

INVENTOR
FRANK R. MARQUARDT
BY
ATTORNEYS

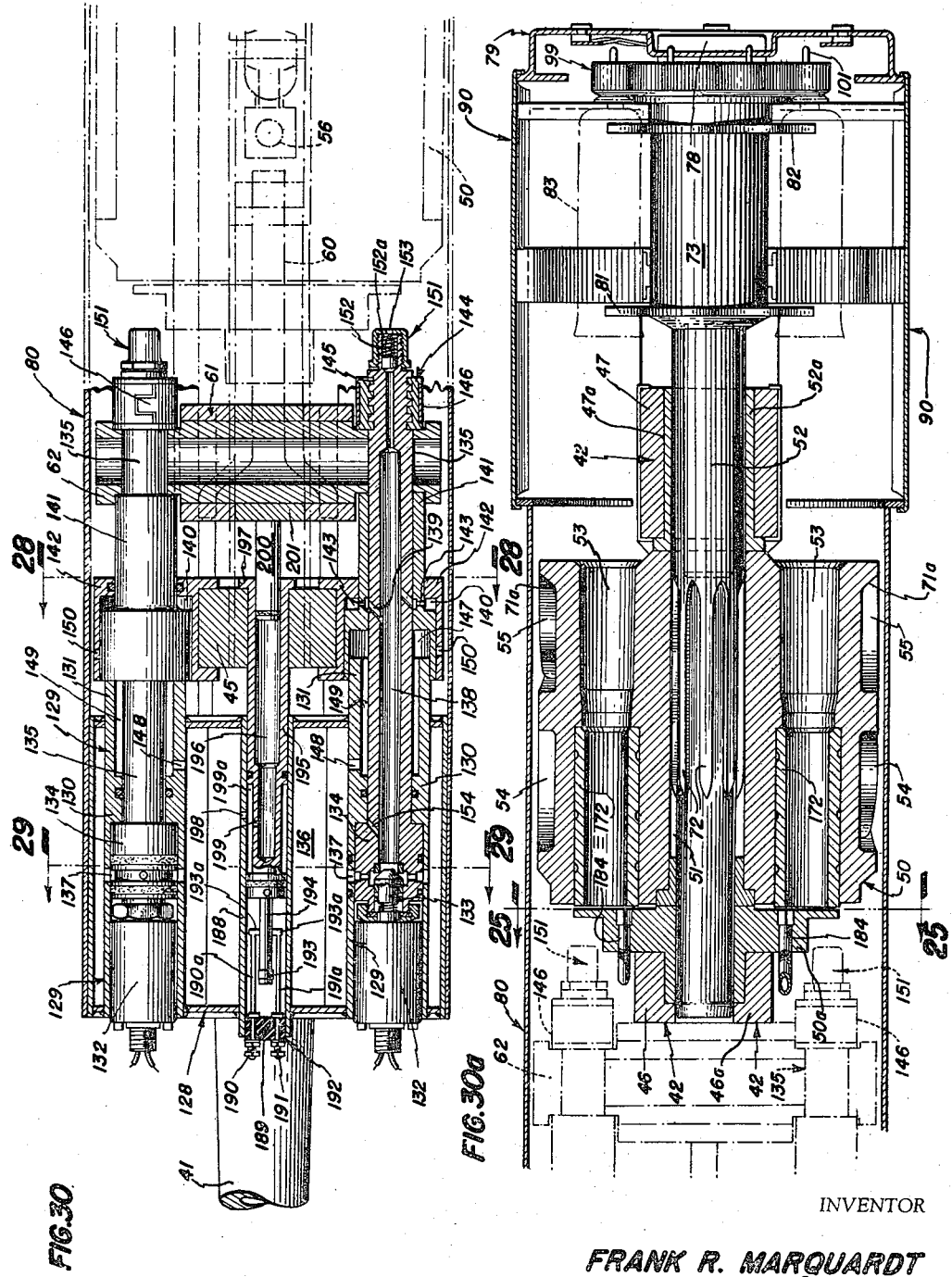

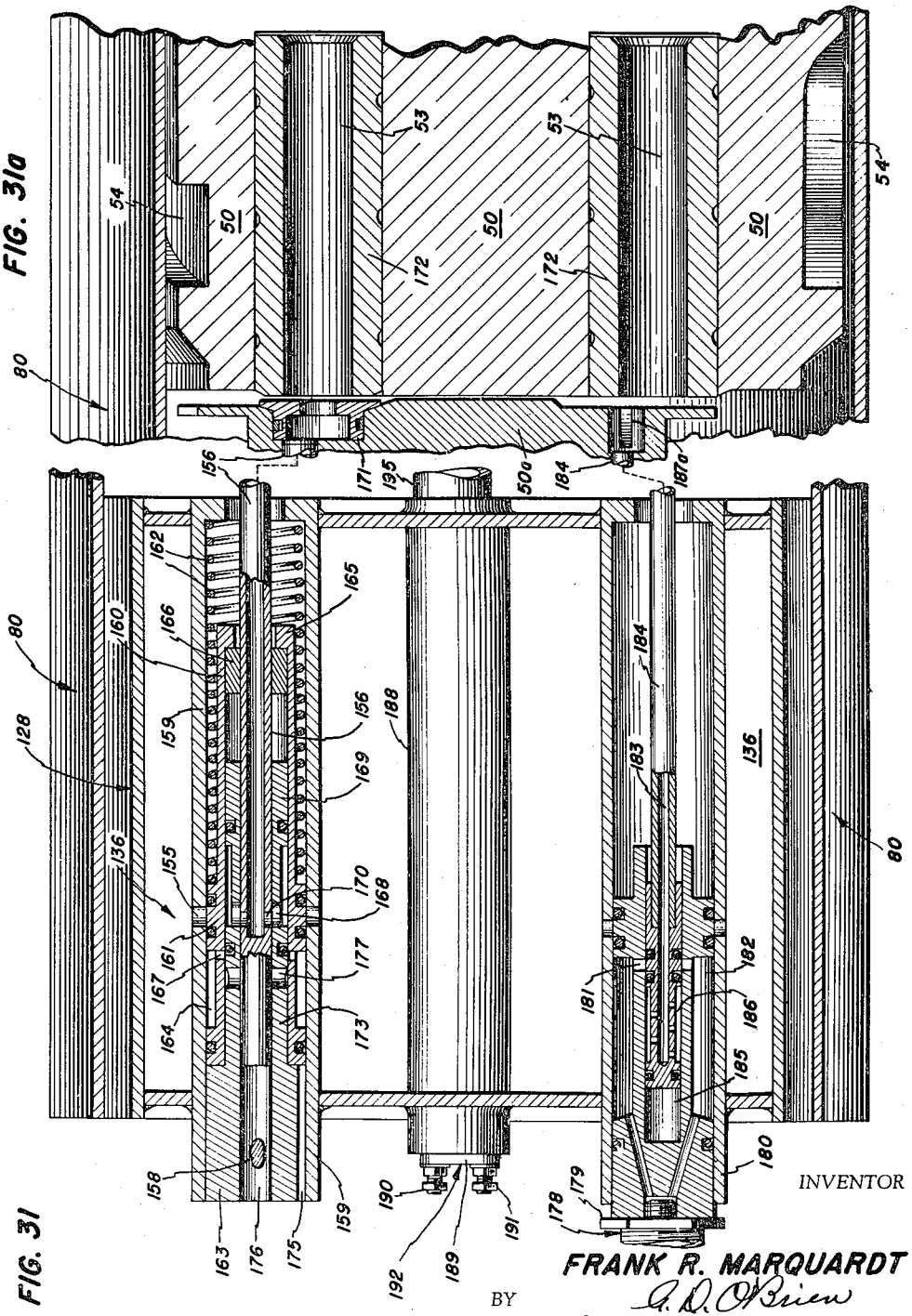

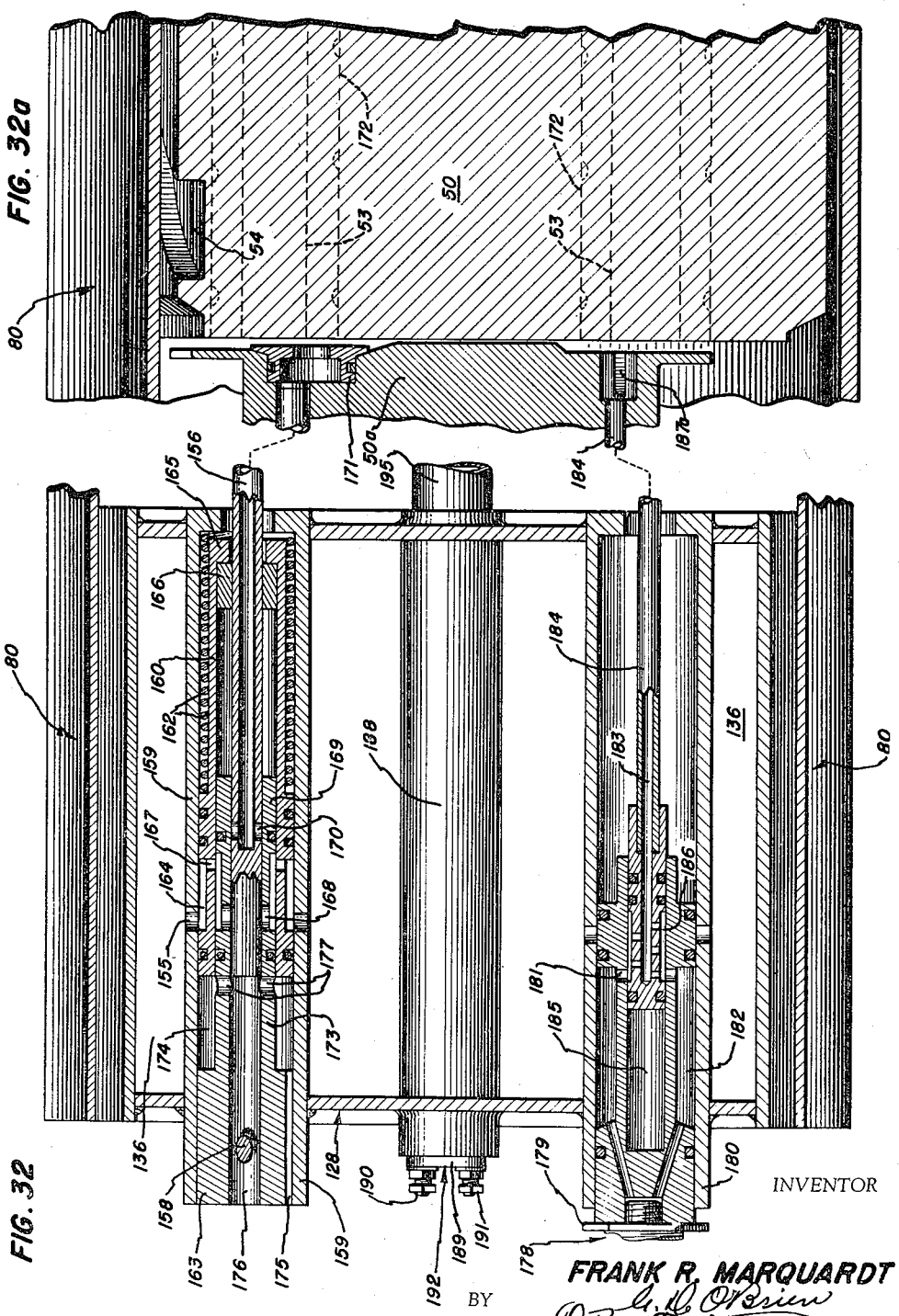

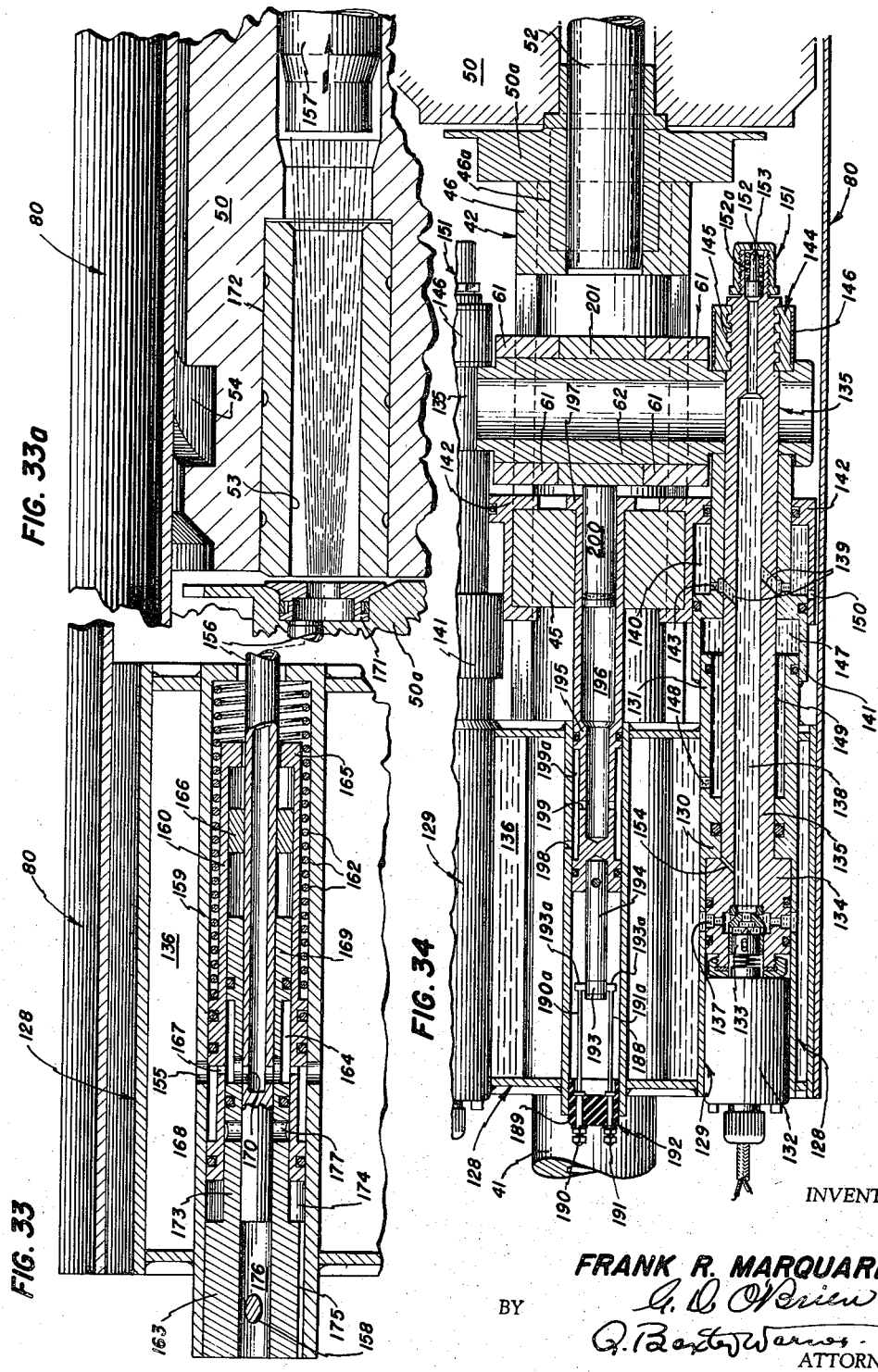
Feb. 21, 1961
F. R. MARQUARDT
RAPID FIRE GUN WITH TWO BARRELS AND
A PLURALITY OF FIRING CHAMBERS
Filed April 18, 1950
2,972,286
21 Sheets-Sheet 17
INVENTOR
FRANK R. MARQUARDT
ATTORNEYS

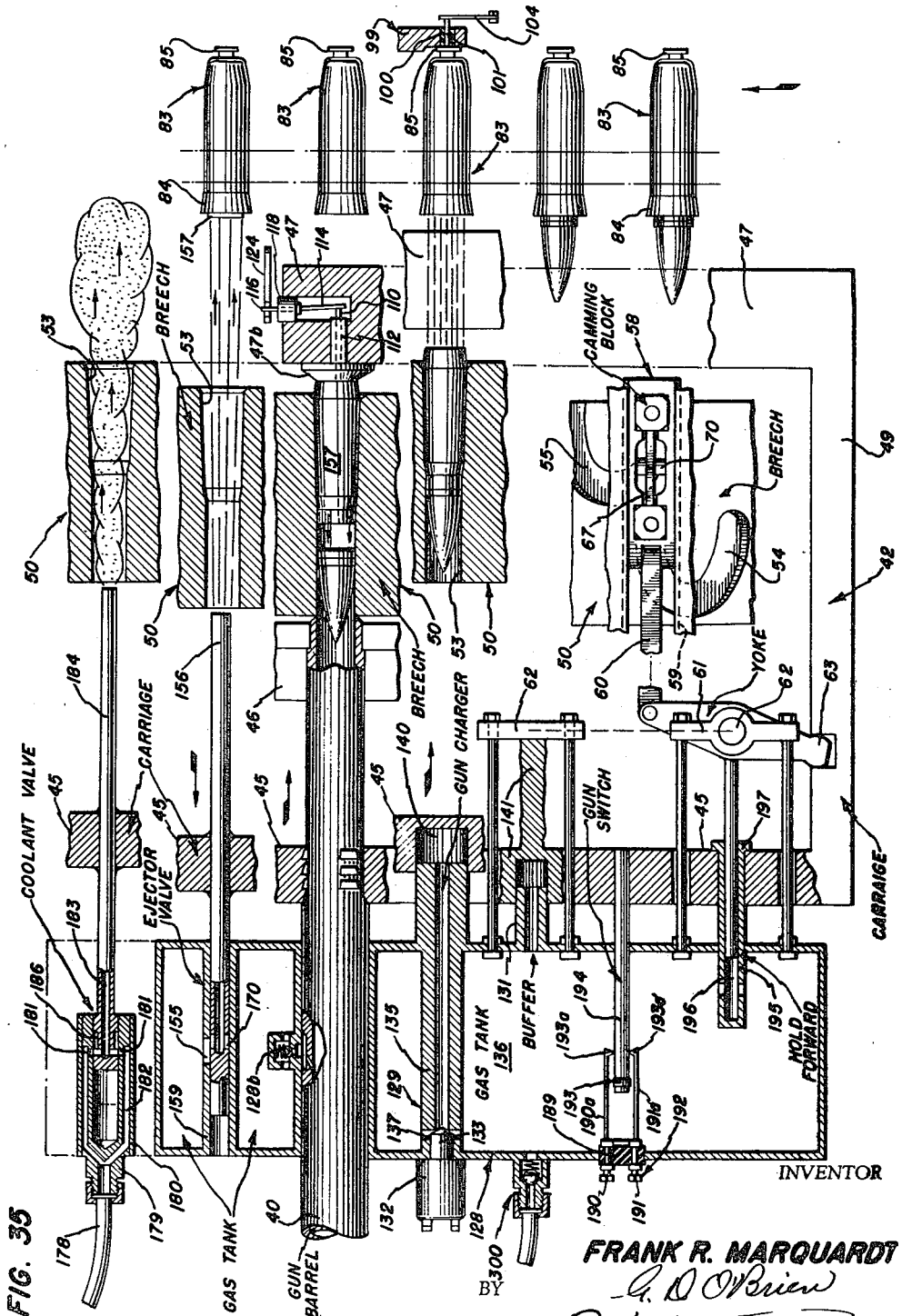

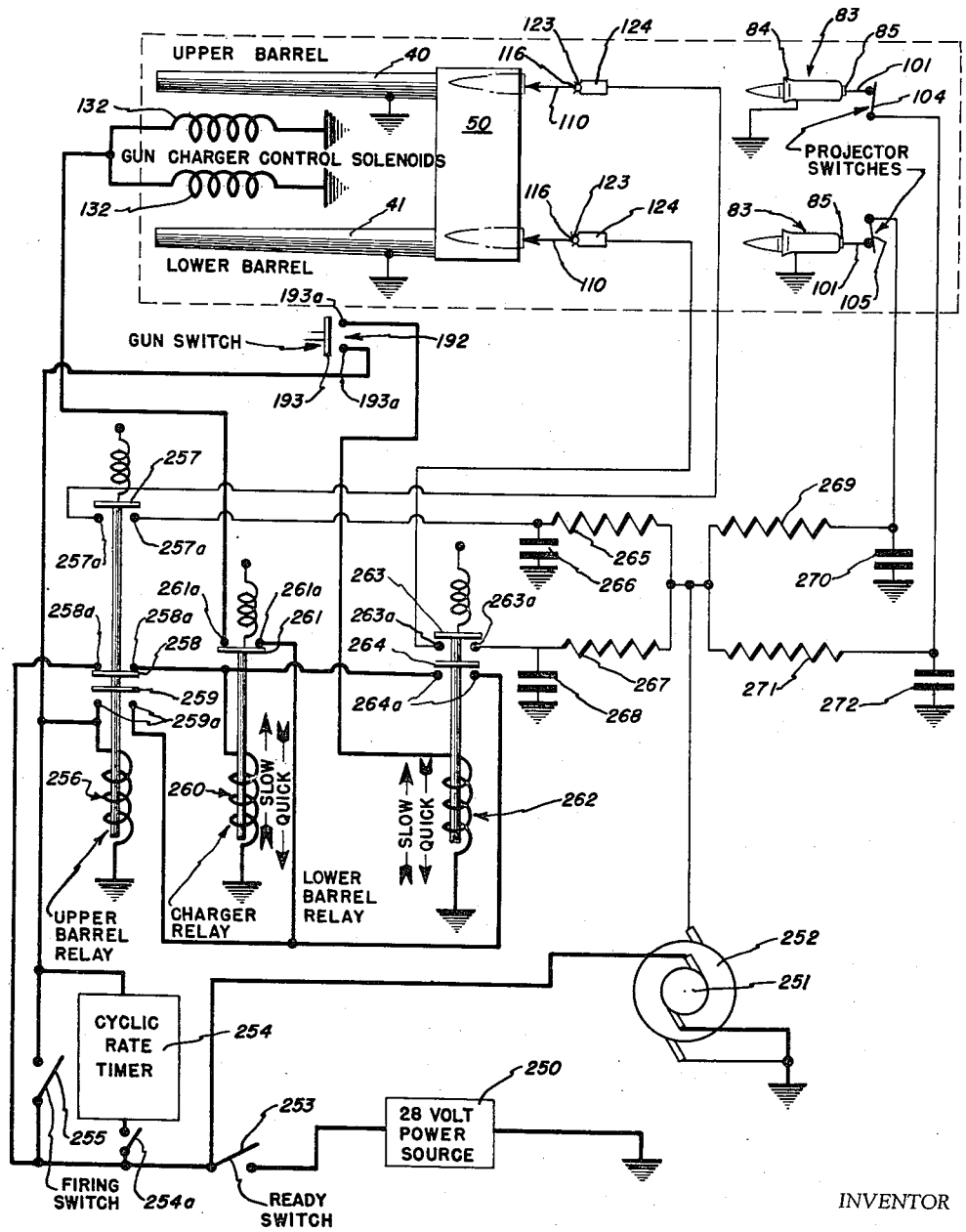

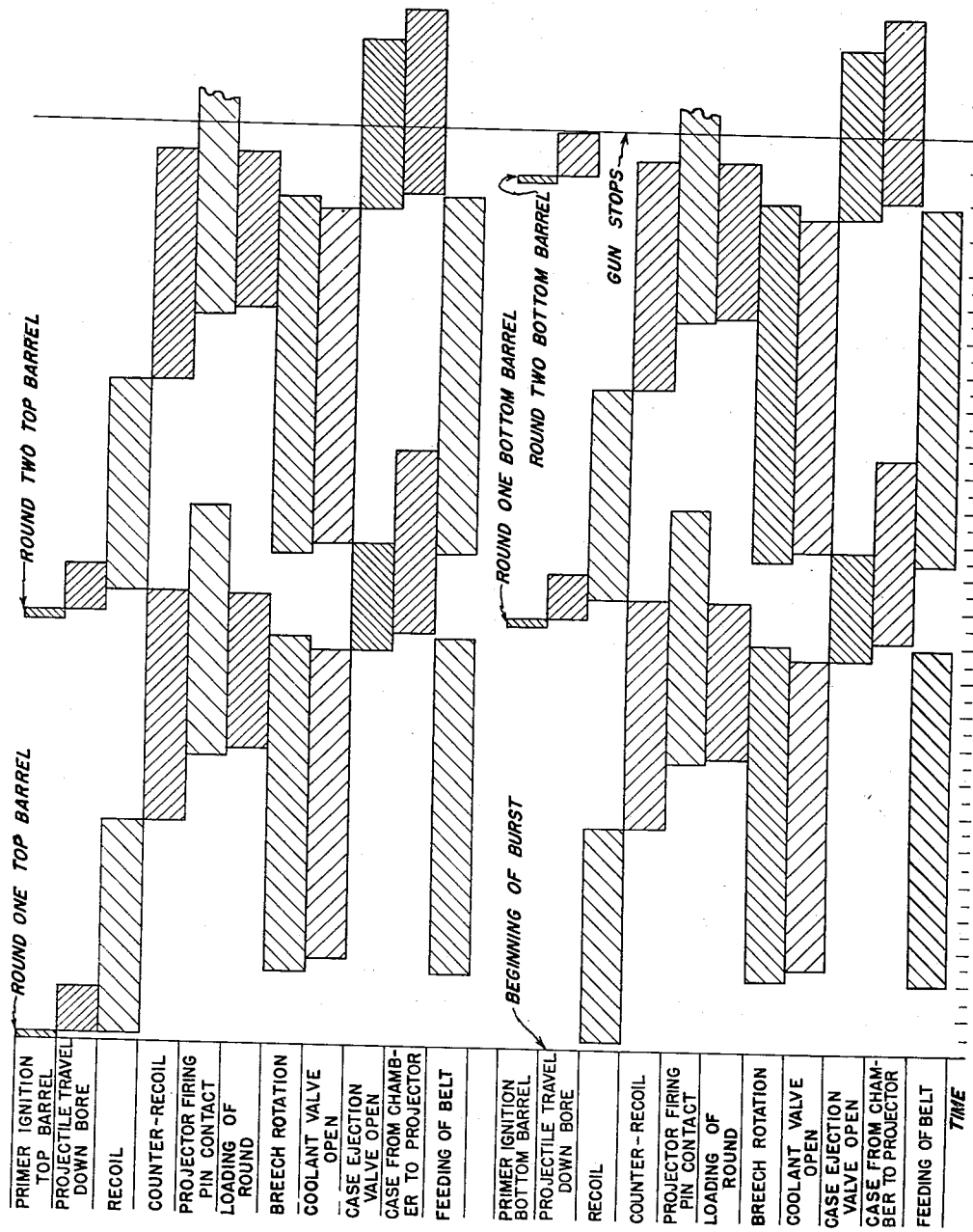

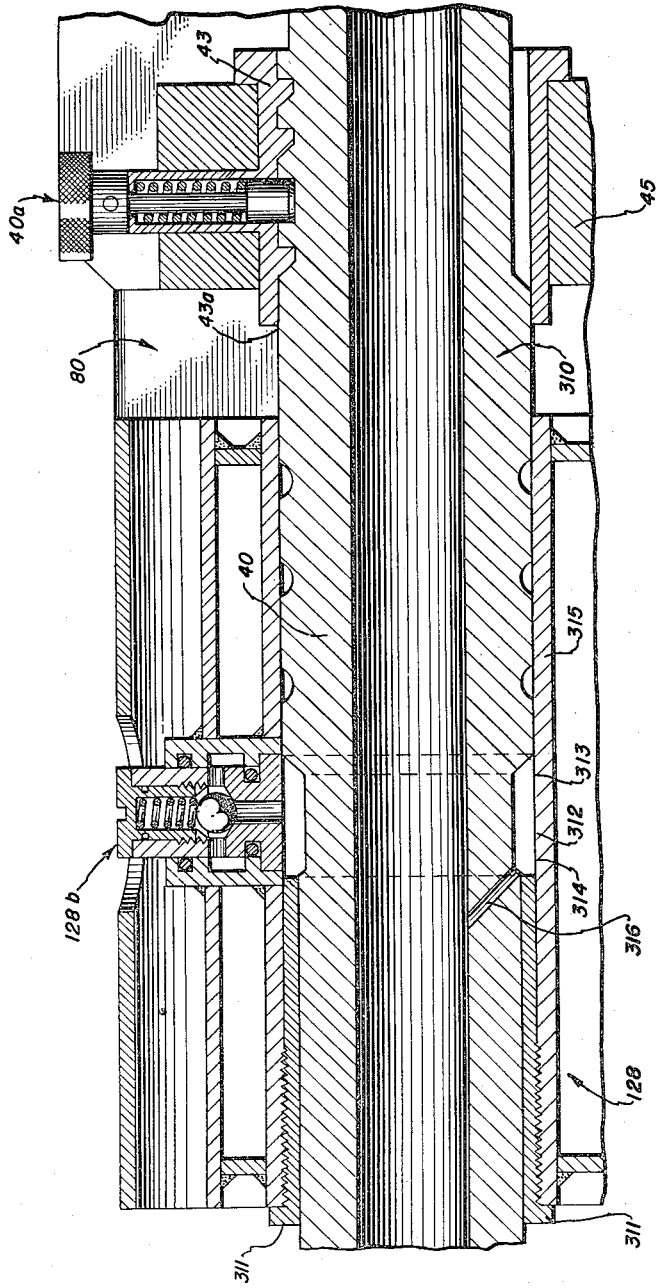

United States Patent Office 2,972,286
Patented Feb. 21, 1961

2,972,286

RAPID FIRE GUN WITH TWO BARRELS AND A PLURALITY OF FIRING CHAMBERS

Frank R. Marquardt, 712 15th St., Alexandria, Va.

Filed Apr. 18, 1950, Ser. No. 156,641

24 Claims. (Cl. 89—126)

(Granted under Title 35, U.S. Code (1952), sec. 266)

The present invention relates to rapid fire guns and more particularly to a revolving breech gun whose mechanical operation is accomplished principally through the recoil action thereof, and whose recoil impulse is counteracted by a translation of the rearwardly directed recoil impulse into a forwardly directed counterrecoil impulse through the action of the revolving breech, permitting the counterrecoil impulse of each firing to be counteracted substantially by the recoil impulse of the subsequent firing.

The speed with which modern warfare is waged, particularly in the air, has produced a need for weapons which can direct to a target the maximum fire power in the shortest period of time. For instance, present day jet propelled and rocket type aircraft move at such high speeds that they are usually within firing range for only a very short interval of time. The conventional type of gun with its relatively slow rate of fire is rapidly becoming incapable of coping with such modern aircraft.

The developments of modern warfare have thus made particularly significant the provision of small fast airplanes with relatively great fire power. The fire power of a particular craft may be increased by increasing the caliber of the guns carried, the rate of fire of the guns, or by increasing the number of guns carried. However, due to the relatively light construction of aircraft, the fire power available is seriously limited by the effect of the recoil forces of the guns upon the aircraft structure, by the total weight that can be carried, and by the space available for mounting of guns. The several methods employed by guns commonly in use for counteracting or cushioning the recoil forces are usually slow acting and necessitate relatively cumbersome recoil springs or recoil absorbers, substantially increasing the size and weight of the guns and seriously limiting the number, size, and rapidity of fire of guns which may be mounted on aircraft. Furthermore, the recoil cushioning means commonly employed are not sufficiently effective to permit the widespread use on aircraft of rapid fire guns of a size exceeding 20 mm.

Heretofore, in the development of automatic firearms a major problem has been the provision of rapid, positive, and safe means for supplying ammunition to the firing chamber and removing the empty cartridge cases therefrom. It has been the practice to secure rounds together in side by side relationship by means of metal clips, and belts of ammunition so formed have been housed in magazines from which they are withdrawn to pass along a path to the rear of the breech of the gun into which the rounds are loaded by mechanical means, being simultaneously separated from the belt which thereupon disintegrates and is discarded. The used cartridge cases are thereafter also discarded as soon as they are extracted from the breech. It is apparent that the rate of fire of such prior constructions is limited both by the speed of operation of the loading mechanism and of the fired cartridge case ejecting means. In addition, when the clips and empty cartridge cases are discarded or ejected, they are thrown about and occasionally catch in the discharge chute, or jam, or pile up and stop or hinder the operation of the gun.

Another disadvantage prevalent in automatic guns is that the rate with which projectiles may be fired has been uncontrollable by the operator except by intermittent operation of the firing mechanism. In such guns, during any continuous burst, the projectiles leave the gun at a fixed rate, with the result that ammunition may be needlessly expended.

Another disadvantageous characteristic of prior art guns has been their tendency to jam when the feeder or bolt malfunctions. It has been necessary in many types of rapid fire guns to clear the jam manually or in some instances to wait until return to a base and complete the mission with an inoperable gun. The delay resulting therefrom may be tactically fatal.

The present invention contemplates overcoming these and other disadvantages of prior art guns. By way of introduction, the embodiment of the present invention herein described in detail comprises two barrels carried by a reciprocably mounted carriage. A breech is revolvably mounted upon the carriage or frame member and reciprocates therewith, having a plurality of firing chambers provided therein along axes parallel to the axis of revolution thereof, and describing a substantially circular pattern abou the axis of rotation of the breech. A plurality of substantially U-shaped camming grooves are formed on the outer circumferential surface of the breech. A pivot shaft extending transversely to the path of carriage reciprocation and stationary during normal operation of the gun, is provided with a yoke pivotally mounted thereon medially of the yoke ends, one end being linked to the carriage for correlating the pivotal yoke movements with carriage reciprocation. A camming block is linked to the other end of said yoke to provide oppositely directed reciprocations of said block and carriage. Cam block rollers cooperate with the afore-mentioned camming grooves on the revolvable breech so that the combined opposed reciprocations of the camming block and the revolvable breech mounted on the carriage, which result from the recoil impulse of the firing of the gun, cause the breech to revolve until a camming block roller operating during a particular cycle of the gun reaches the apex of a camming groove with which it is cooperating; whereupon, the rotational momentum thus imparted to the revolving breech cams the block into the opposite direction of motion as the breech continues to rotate, thereby reversing the direction of carriage movement by means of the pivotally mounted yoke.

Relating the above discussion to the firing of the gun, if starting from battery position a round of ammunition is fired, the recoil impulse resulting therefrom drives the carriage rearwardly along with the gun barrels and revolvable breech mounted thereon. The action of the rearwardly moving carriage upon the pivotally mounted yoke drives the camming block forward. The rearwardly moving breech is thus cammed into a revolving motion by cooperation of a camming block roller with one of the camming grooves until that roller reaches the apex of the groove; whereupon, the revolving momentum of the breech cams the block into rearwardly directed movement, which results in driving the carriage forward by means of the pivotally mounted yoke in a counterrecoil movement. Thus, the rearwardly directed recoil impulse is translated through the intermediary of the revolving breech into a forwardly directed counterrecoil impulse. Before the gun returns to battery position, its operation is such as to automatically fire two rounds of ammunition, one round counteracting the forwardly directed counterrecoil impulse of the first-mentioned round and the other round again sending the carriage into recoil movement with substantially the recoil impulse of that one round.

A rate of fire control means may be provided in the electrical firing circuit of the present gun to enable variations in the rate of firing between bursts or during any particular burst. Also, belted ammunition projectors or holders are provided which cooperate with the operation of the present gun to automatically feed new rounds to the gun and load them into the firing chambers of the breech by gas pressure or explosive means rather than mechanical means, thereby greatly enhancing the rapidity with which the rounds may be loaded and eliminating the undesirable effect of bolt impact on the cartridge case. The recoil caused rotation of the breech registers in turn each opposite pair of circularly disposed firing chambers with the two barrels of the gun, while synchronously therewith advancing ammunition belts to bring a new pair of rounds into alignment with the pair of firing chambers rotationally succeeding those aligned with the barrels and previously loaded. Upon alignment, the rounds are loaded into the chambers. Also, there is a means included in the gun cooperating with the hereinabove described operation thereof to eject misfire or dud rounds and fired cartridge cases from the breech by use of high pressure gas, to return the rounds or cases to the empty projectors from which they were loaded into the breech. Also, cooling means are provided for injecting a suitable coolant into the thus emptied firing chambers upon each cycle of operation of the gun. The structure, mechanism, and operation of the present gun will be more clearly understood from a consideration of the detailed description thereof had below.

It is, therefore, one object of the present invention to provide a new and improved, fully automatic, all purpose, rapid fire gun, particularly adapted for use in airplanes, although not limited thereto.

Another object of this invention is to provide a gun by which a larger number of rounds may be fired in a given time than has heretofore been possible with the types of guns commonly employed, and in which the rate of fire for a burst of rounds or during such a burst may be controlled at the will of the operator.

Another object of the present invention is to provide a rapid fire gun which is light in weight and compact in structure, whereby it may be readily employed in aircraft turrets or other mobile installations of limited space.

Another object of the present invention is to provide a recoil system of positive acting mechanical design, whereby the overall length and size of the gun may be substantially reduced as compared to conventional guns of equal caliber, and the recoil energy successfully counteracted with a minimum of trunnion thrust over a smaller recoil distance than has heretofore been possible.

Another object of the present invention is to provide a recoil counteracting or balancing means, whereby the recoil impulse of one firing of the gun is substantially counteracted by the recoil impulse of a subsequent firing.

Another object of the present invention is to provide a recoil means for guns whereby the recoil impulse of one firing is translated from its initially rearward direction into a rotational torque and thence translated to a forwardly directed counterrecoil impulse, thereby enabling the counteracting and dissipating thereof by a subsequent firing upon the recoiling parts approaching battery position, and wherein the recoil distance of the gun is substantially reduced as compared to guns employing prior recoil cushioning means.

Another object of the present invention is to provide a recoil counteracting means for automatic guns, wherein the initially rearwardly directed recoil impulse of one firing of the gun is translated into a rotary impulse and thence into a forwardly directed counterrecoil impulse to return the recoiling portion of the gun toward battery position, and upon its approach to battery position the gun is automatically fired; the rearwardly directed recoil impulse of the second-mentioned firing substantially counteracting or dissipating the forwardly directed counterrecoil impulse resulting from the first-mentioned firing.

Another object of the present invention is to provide for the translation of the rearwardly directed recoil action of an automatic gun into a rotary action of a rotatable breech containing a plurality of firing chambers, whereby the firing chambers are successively indexed in turn with the barrel or barrels of the gun as a result of the firing of the gun.

Another object of the present invention is to provide for the advancement of belted ammunition into a gun loading position through rotation of a rotatable breech, controlled in its rotation by the recoil actions of the gun.

Another object of the present invention is to provide a recoil counteracting or dissipating means wherein the initially rearwardly directed impulse of a firing is translated into a rotational impulse and thence translated into a forwardly directed counterrecoil impulse, returning the recoiling parts of the gun toward battery position, and a second firing is automatically had upon the approach to battery position to provide a counteracting rearwardly directed recoil impulse, the first and last firings of a burst each providing a recoil impulse of a single round and intermediate firings causing a recoil impulse of two rounds; the first firing thereby causing the recoiling parts of the gun to move rearwardly and then forwardly with the recoil impulse of a single round, each intermediate firing substantially counteracting the forwardly directed counterrecoil impulse of the preceding firing and further acting upon the recoiling parts of the gun with substantially a net recoil impulse of a single round, and the last firing of the burst substantially counteracting the single round counterrecoil impulse remaining from the preceding firing to bring the recoiling portions of the gun substantially to a halt.

Another object of the invention is to provide for instantaneous starting at maximum cyclic rate and for instantaneous stopping of a burst.

Another object of the invention is to decrease the reciprocating mass required for loading rounds into a gun, to the mass of the rounds alone.

Another object of the invention is to provide a gun whereby, with an interchange of the revolving breech and a reassembly of the gun, rotational operation in a clockwise or counterclockwise direction can be obtained.

Another object of the present invention is to provide a rapid fire gun wherein all the moving parts are mechanically interlocked to maintain a perfect in phase relationship therebetween.

Another object of the present invention is to provide a gun of the type above-described which is readily and easily field stripped and assembled without the use of specialized tools.

Another object of the present invention is to provide for loading of rounds into a gun at a more rapid rate than has heretofore been possible in prior conventional automatic guns.

Another object of the present invention is to provide for the loading of rounds into the firing chambers of a gun by means of explosive loading caps, gas pressure, or the like, designed to drive the ammunition into the loading chambers by gas pressure upon the alignment thereof with said chambers.

Another object of the present invention is to provide for the loading of rounds into the firing chambers of a gun by aligning them with the firing chambers by means of gun recoil advanced belted ammunition projectors or holders, having explosive ammunition loading caps fired upon the alignment of the rounds with the firing chambers.

A further object of the present invention is to provide a cartridge case or dud round ejection system which is automatic in operation and is controlled by the cyclic action of the gun.

A further object of the present invention is to provide a cartridge case or dud round ejection system which operates automatically in conjunction with the cyclic action of the gun to expel empty cartridge cases or dud rounds from the firing chambers of the breech upon each chamber reaching the ejection position.

A still further object of the present invention is to provide cooling means for preventing the firing chambers of a gun from exceeding a desired temperature range during operation.

Still another object of the present invention is to provide a gun with a hang-fire proof construction and operation, wherein in the event of a hang-fire the firing chambers of the gun remain in registry with the barrels a sufficient time to give the rounds a chance to fire, and thereafter the gun automatically continues its operation.

A still further object of the present invention is to provide an automatic gun which continues automatic operation despite the presence of a dud round or duds in the firing chamber or chambers in firing position.

Still another object of the present invention is to provide an automatic recoil operated gun having a gas assisted recoil action.

An additional object of the present invention is to provide an electrical firing and operational control system for automatic guns which accomplishes the loading of rounds into the firing chambers, the appropriate firing of rounds so loaded to enable the counteraction of the recoil energy of one firing by the recoil energy of a subsequent firing, and the automatic charging of the gun when at rest, and enables an adjustment of the rate of automatic fire.

Other objects and advantages of the present invention will be apparent from a consideration of the following detailed description thereof made in conjunction with the accompanying drawings, wherein like numerals refer to like or corresponding parts and in which:

Fig. 7 is a longitudinal vertical sectional view through the central portion of the gun;

Fig. 8 is an enlarged detailed cross section of a portion of Fig. 7 taken along a line substantially corresponding to line 8—8 of Fig. 7, and showing details of the ammunition firing pin and firing pin structure;

Fig. 9 is an enlarged longitudinal section of a portion of Fig. 8 taken on a line substantially corresponding to line 9—9 thereof;

Fig. 16 is an enlarged longitudinal section through the rear end of the present gun showing details of the loading cap firing means and the ammunition firing means;

Fig. 17 is a view of the rear of the gun with the rear wall cut away to show the details of the electrical connections for the loading cap firing means;

Fig. 18 is a detailed view of the loading cap electrical firing contact means taken on a line substantially corresponding to line 18—18 of Fig. 17;

Fig. 19 is a similar detailed view taken along a line substantially corresponding to line 19—19 of Fig. 17;

Fig. 20 is a top plan view of the rear to central portion of the gun comprising the present invention;

Fig. 21 is a front elevational view of the gun;

Fig. 22 is a rear elevational view of the gun;

Fig. 23 is a left side elevation of the rear to central portion of the gun partially cut away to reveal the recoiling parts in battery position;

Fig. 24 is a similar view but changed in position, with the parts shown at the end of rearward recoil;

Fig. 25 is a vertical cross-sectional view looking forward and taken along a line substantially corresponding to line 25—25 of Fig. 23 which corresponds in location to line 25—25 of Fig. 30a;

Fig. 26 is a detailed vertical sectional view taken along a line substantially corresponding to line 26—26 of Fig. 25;

Fig. 27 is a vertical cross-sectional view looking forward and taken along a line substantially corresponding to line 27—27 of Fig. 23;

Fig. 27a is a fragmentary enlarged longitudinal section through the rotatable breech taken on a line substantially corresponding to line 27a—27a of Fig. 23;

Figs. 30 and 30a are enlarged horizontal longitudinal sections of forward and rear portions of the gun respectively taken along a line substantially corresponding to line 30—30 of Fig. 23, particularly showing the details of two charger mechanisms in battery position;

Figure 10:
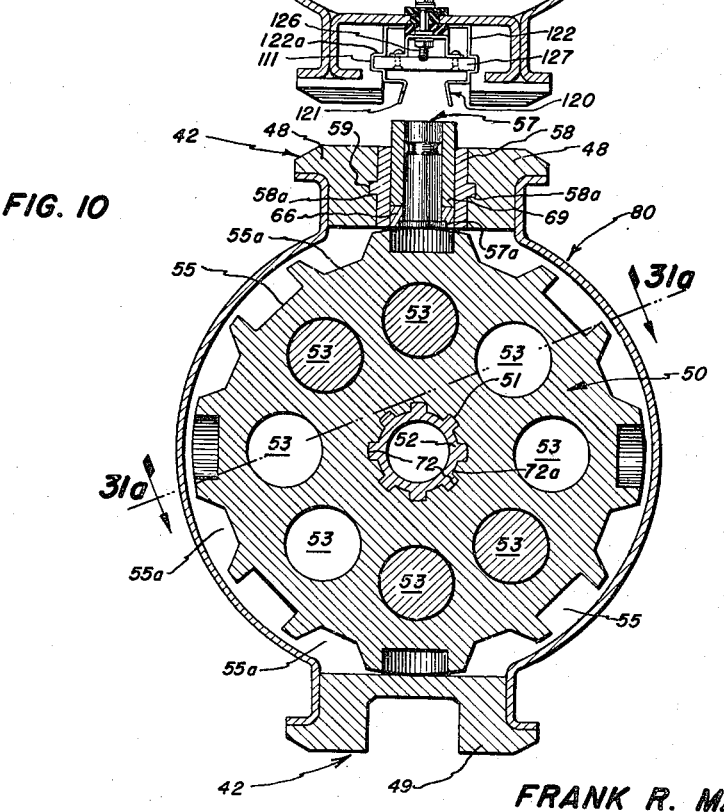
Fig. 10 is an enlarged cross section looking forward, taken on a line substantially corresponding to line 10—10 of Fig. 7.
Figure 12:
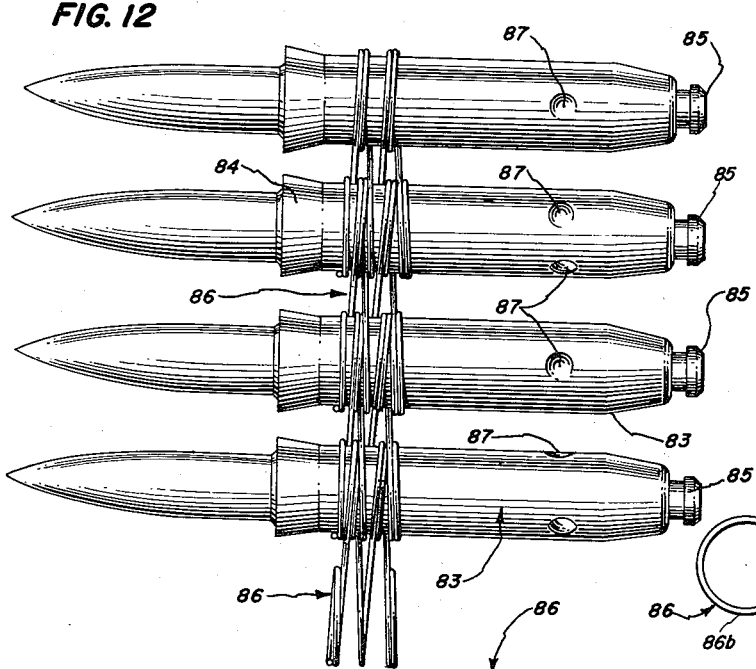
Fig. 12 is a plan view of an ammunition belt constructed in accordance with the present invention.
Figure 13:
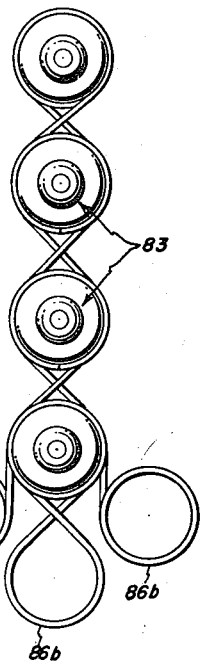
Fig. 13 is a rear end view of the belt shown in Fig. 12.
Figure 14:
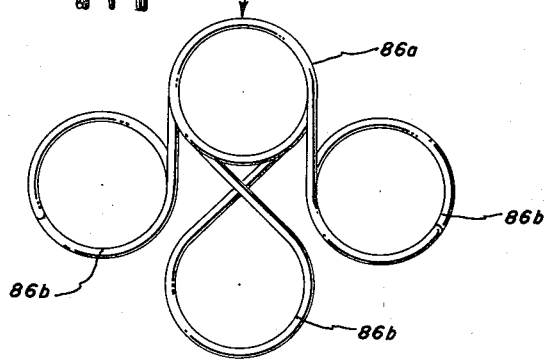
Fig. 14 is a view of a single belt clip of the character shown in Figs. 12 and 13.
Figure 15:
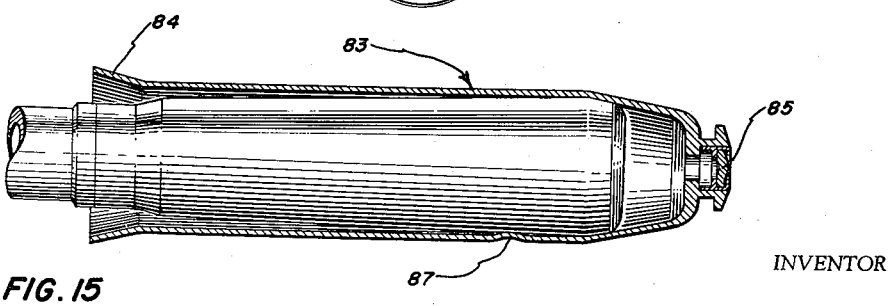
Fig. 15 is an enlarged longitudinal section of one of the ammunition projectors employed in the belt of Fig. 12 carrying a round therein.
Figure 28:
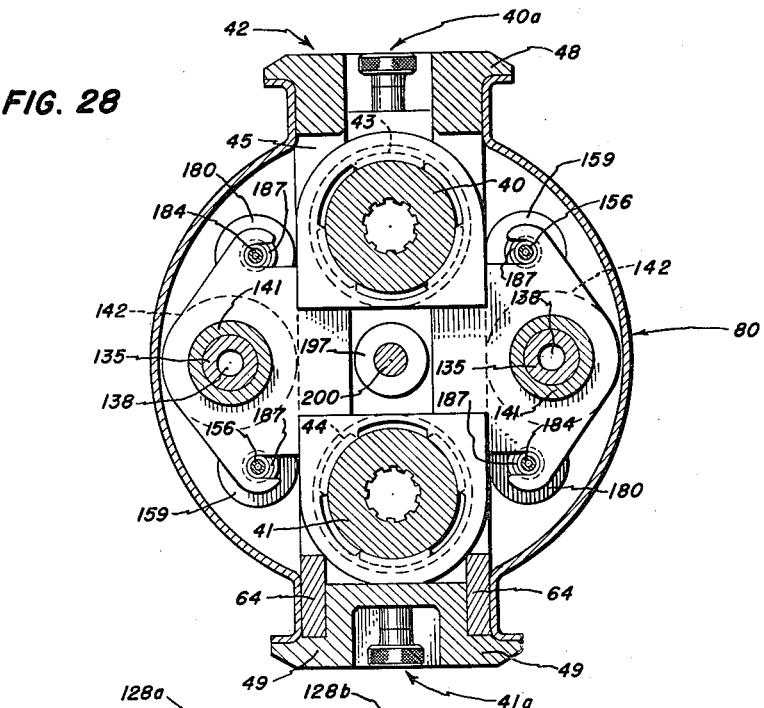
Fig. 28 is a vertical cross-sectional view looking forward taken along a line substantially corresponding to line 28—28 of Fig. 23 which corresponds in location to line 28—28 of Fig. 30.

Figs. 31 and 31a are horizontal longitudinal sections through the ejection and cooling systems in battery position, Fig. 31 being taken along a line substantially corresponding to line 31—31 of Fig. 21 and Fig. 31a being taken at a slightly rotated position therefrom along a line substantially corresponding to line 31a—31a of Fig. 10;

Figs. 32 and 32a are views similar to Figs. 31 and 31a respectively, but showing the parts in rearward recoil position;

Figs. 33 and 33a are views of the upper portions of Figs. 31 and 31a respectively, showing the ejection system in operation at about 80% of return to battery position;

Fig. 34 is an enlarged horizontal longitudinal sectional view of the central portion of the gun, showing the details of the charger mechanism and a hold-forward means employed in the operation of the present gun;

Fig. 35 is a schematic representation showing the operation of various parts during the firing cycle of a single shell from one barrel of the gun;

Fig. 36 is a diagram of the electrical firing and operational control circuit employed in the present gun;

Fig. 37 is a chart showing the timing of a cycle of operation of the several parts of the gun during a burst of four rounds duration; and Fig. 38 is a longitudinal sectional view through one barrel showing a modification of the structure thereof.

*The recoil and indexing system*

Figure 1:
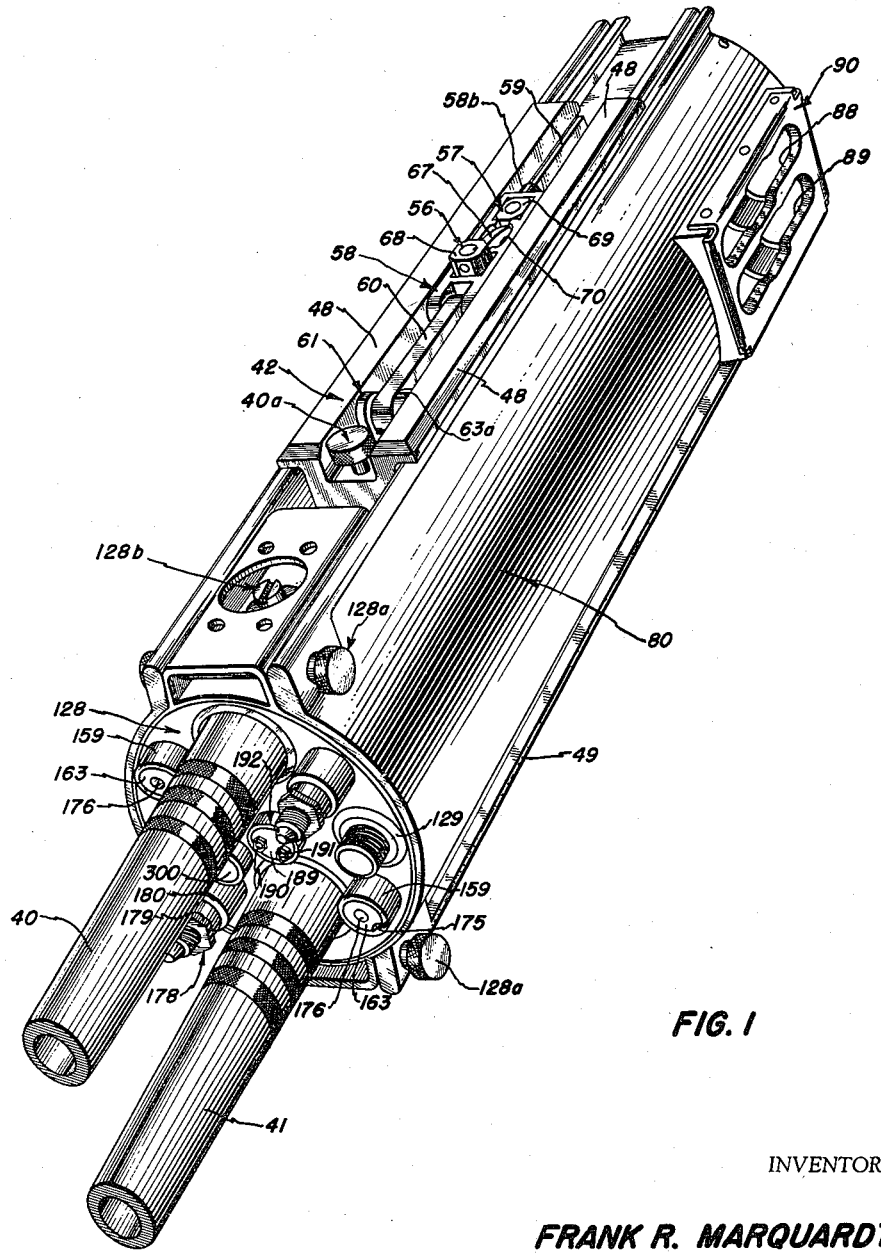
Fig. 1 is a top forward perspective view of the present invention with the gun completely assembled.
Figure 2:
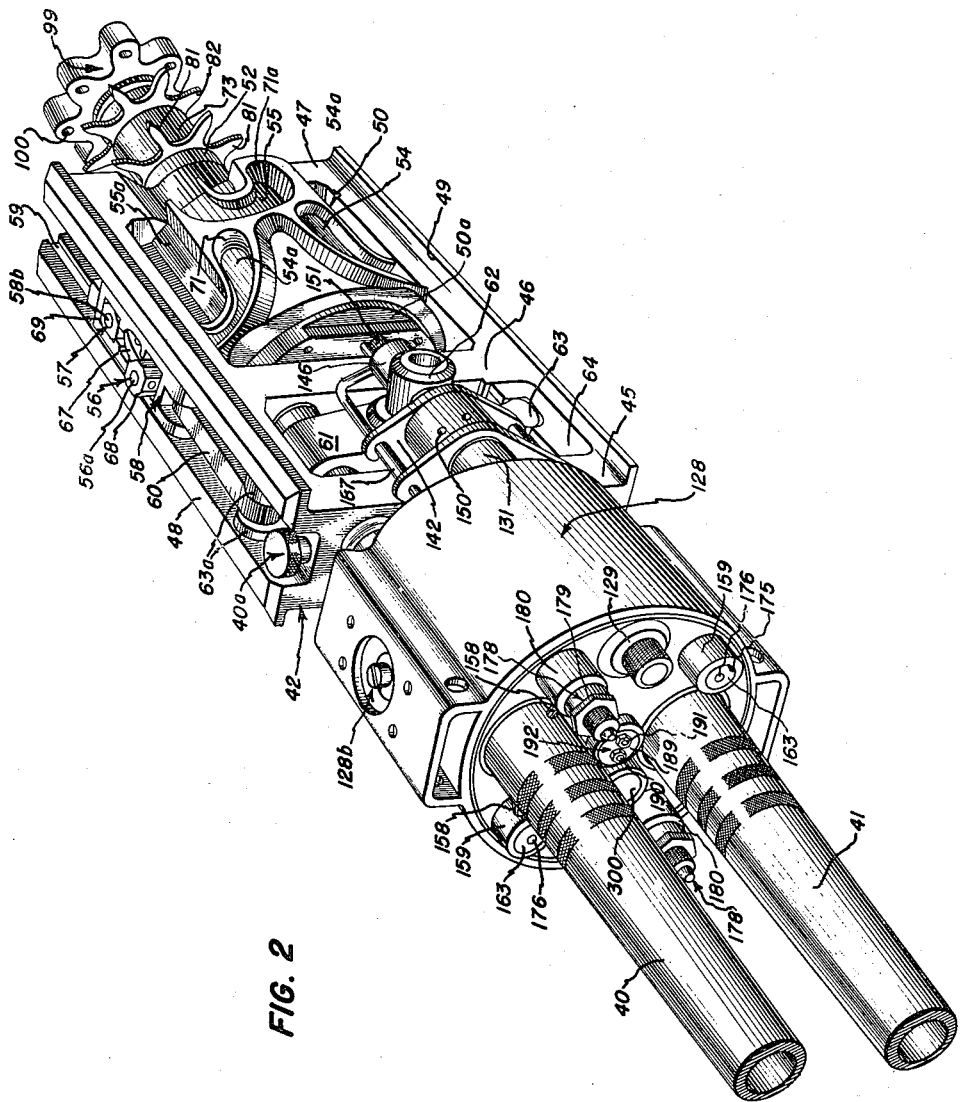
Fig. 2 is a substantially similar view with the receiver casing removed.
Figure 3:
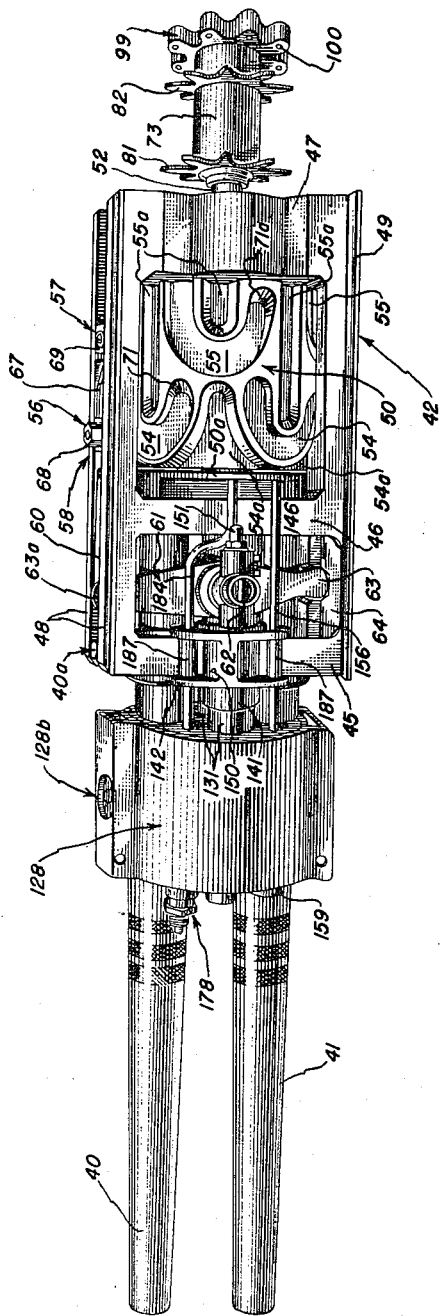
Fig. 3 is a side perspective view of the device with the receiver casing removed.
Figure 4:
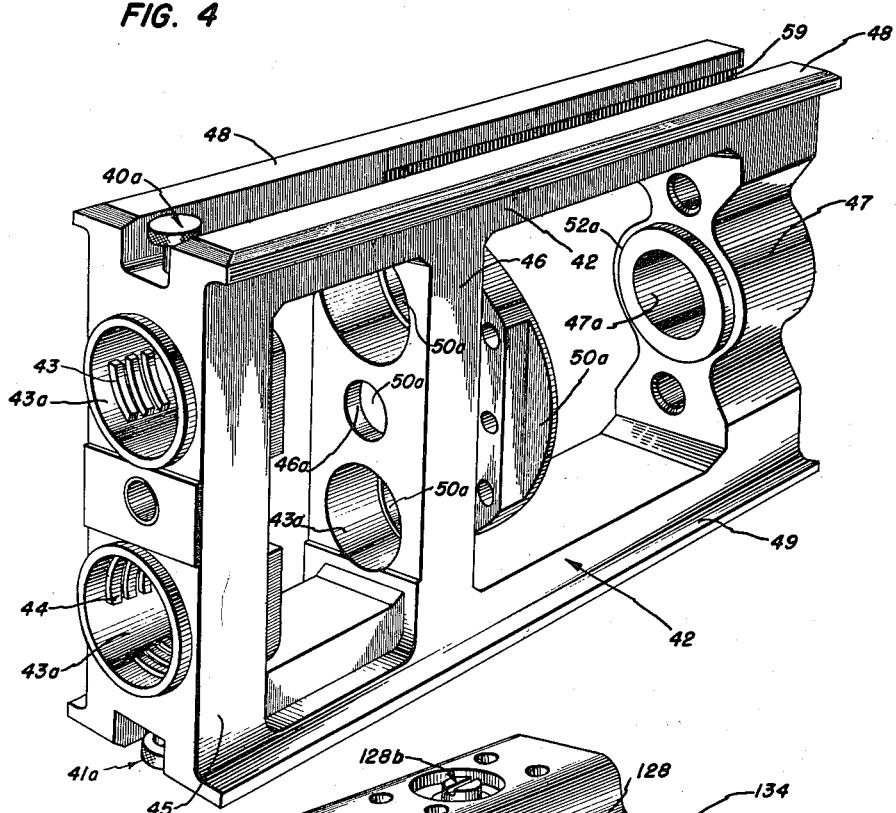
Fig. 4 is an enlarged perspective view of the sliding carriage shown in operative position in Figs. 2 and 3.
Figure 5:
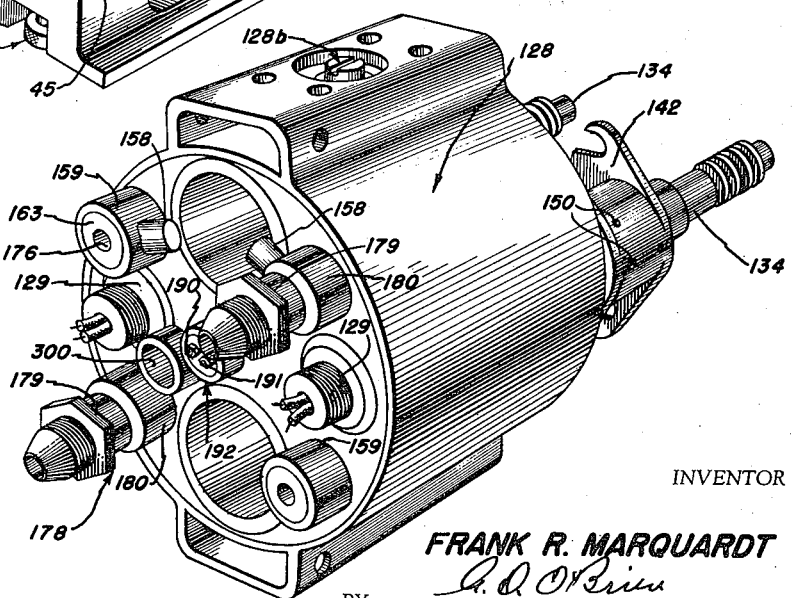
Fig. 5 is an enlarged perspective view of a high pressure gas tank assembly shown in operative position in Figs. 1, 2, and 3.
Figure 6:
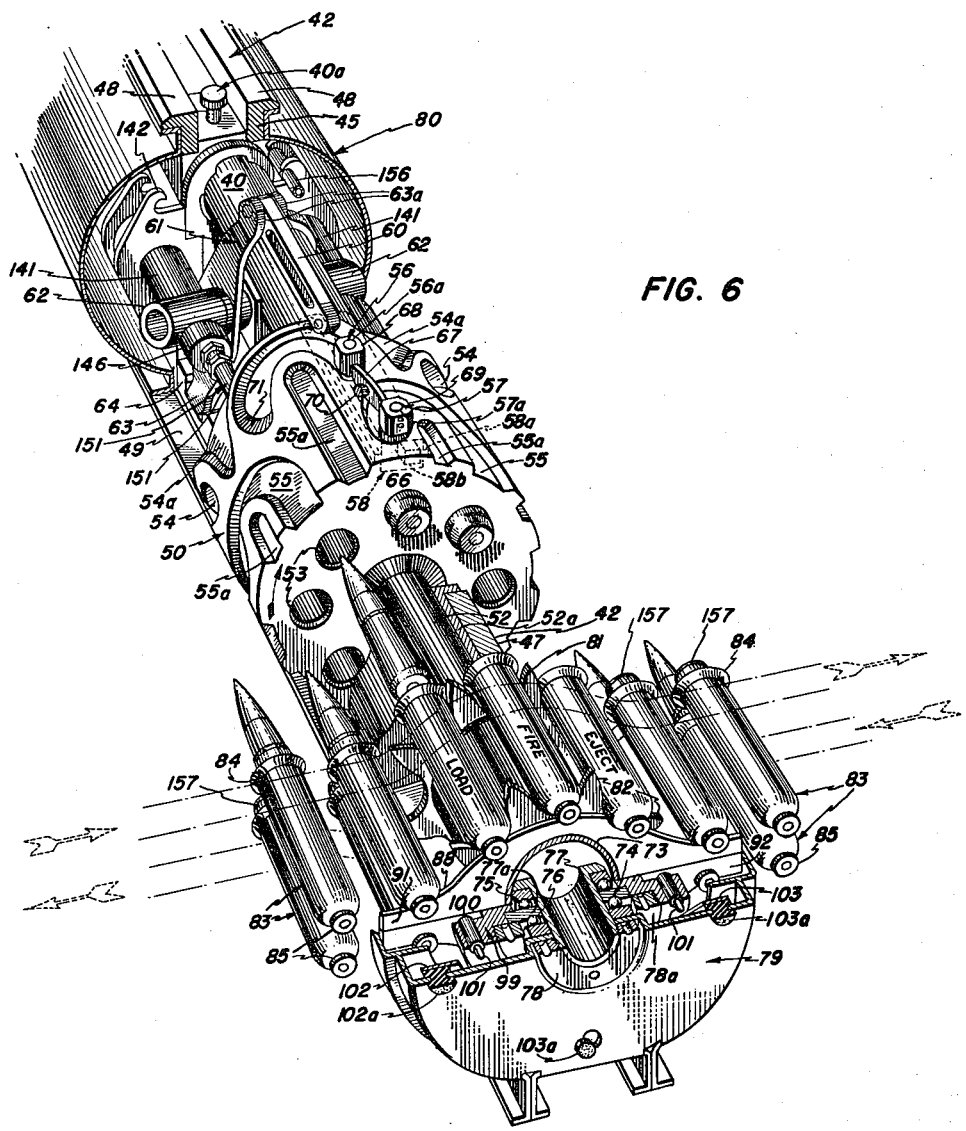
Fig. 6 is a rear perspective view taken from the upper left of the gun with a portion of the receiver casing and carriage broken away, showing particularly the ammunition feed mechanism, the revolvable breech, the camming block, and their operating mechanism.

Referring to the drawings and particularly to Figs. 1 to 7, the present invention comprises a pair of spaced upper and lower gun barrels 40 and 41 which are secured to the forward end of a reciprocable carriage 42 in suitable apertures 43a therefor, by engagement of interrupted threads at the base of each barrel with corresponding threads 43 and 44 formed within said apertures, and are held in threaded engagement therewith by means of the spring pressed detents 40a and 41a (best shown in Fig. 7). The carriage 42 is preferably of the skeleton form illustrated in Fig. 4 comprising forward, central, and rear upright members 45, 46, and 47 respectively, interconnected top and bottom by longitudinal guide portions 48 and 49, providing rails to guide the carriage in sliding reciprocatory movement along the receiver casing 80 (as best shown in Figs. 1 and 6) fixed in position upon a gun mounting by any desired means. In addition to supporting the barrels, the carriage serves to mount a rotatable breech 50, which is preferably in the form of a cylinder having a partially splined central bore 51 therethrough (splines 72a) (see Fig. 7). A correspondingly splined breech supporting shaft 52 (splines 72) is rotatably supported between carriage uprights 46 and 47 in suitable openings 46a and 47a formed therein, and is fixed against longitudinal movement by a thrust bearing and receiver backplate to be described below. Since the breech is mounted on said shaft through its splined central bore 51, it is united therewith in rotary motion but is relatively slidable therealong. A rear bushing 52a is therefore provided between upright 47 and shaft 52, said bushing further providing a rear bearing surface for breech 50, as shown in Fig. 7; and a breech faceplate 50a is also provided, forming a forward bushing between upright 46 and shaft 52, said faceplate being also formed to provide a forward bearing for said breech. The rotatable breech 50 is further provided with a plurality of radially disposed and axially parallel parallel firing chambers 53, there being eight chambers in all employed in the embodiment shown in the drawings. Also, a plurality of substantially U-shaped camming grooves, providing forward and rear groups 54 and 55, together with corresponding relief cuts 54a and 55a, are formed on the outer cylindrical surface of the breech 50.

A pivot shaft 62 is located between carriage uprights 45 and 46 and is fixedly secured in position with relation to the receiver casing 80 through intermediate supporting means to be subsequently described. This shaft pivotally carries a yoke 61, best illustrated in Fig. 6. As shown in Fig. 7, the bottom portions 63 of the yoke 61 are fitted into suitable sockets formed therefor in bearing blocks 64 inserted in the bottom guide portion 49 of the slidable carriage, thus interlocking the pivotal movement of the yoke with the sliding action of the carriage with respect to the receiver 80. The top ends 63a of the yoke are linked through the arm 60 to a camming block 58, which is in turn carried and guided in slidable reciprocatory motion by the grooves 59 formed in the top guide portion 48 of carriage 42, cooperating with flanges 58a formed along the sides of block 58. Thus, as carriage 42 reciprocates along the receiver 80, the cause of which reciprocation will be discussed subsequently, there results a corresponding pivotal reciprocation of the yoke 61, which action is translated into a longitudinal reciprocation of block 58, this latter action being opposite in direction from the action of the carriage and related thereto in extent according to the relation of the upper and lower arm portions of the yoke. The block is provided with forward and rear camming rollers 65 and 66 which are designed to co- operate with the forward and rear sets of camming grooves 54 and 55 respectively, and are linked together for corresponding seesaw action through the arm 67 rockably supported on the block by pin 70.

Thus, as the carriage moves rearwardly with respect to the receiver casing it carries the breech with it, and since the pivot shaft 62 is stationary with respect to the receiver 80, the block is forced to move in a forward direction. As shown in Fig. 7, the roller 65 cooperates with a groove of the set 54 to cam the breech 50 into a clockwise rotary motion in the embodiment shown in the drawings when viewed from the rear of the gun. Because of the opposite movements of the carriage and block, the relative movement therebetween is substantially twice the distance of the movement of the carriage, depending on the position of pivot of the yoke, thereby substantially halving the travel distance of the carriage necessary to transmit the desired portion of the rearwardly directed motion thereof to rotational motion of the breech as would otherwise be necessary if the camming rollers were held stationary. Because of the design of the camming grooves 54 and 55, which are preferably substantially elliptical in shape, practically all of the rearward recoil thrust energy is translated into rotary energy of the breech at the time the camming roller 65 reaches the apex of the camming groove 54, the remainder of the thrust energy having been stored in a hold-forward mechanism to be subsequently described. Whereupon, the rotary momentum of the breech camming the roller 65 along with the forward thrust of the hold-forward drives the carriage forward. The two portions of each camming groove being substantially symmetrical about an imaginary line through and normal to the apex thereof, the rotary energy of the breech is translated into a forward energy of the sliding carriage, adding practically all of the energy back to the reversed carriage. The rotary energy of the breech is thus expended, and neglecting friction and like losses, the resulting forward energy of the carriage is equal to the initial recoil thrust energy. The rearward energy of the carriage is thus translated into a rotary energy of the breech and returned to the carriage as a substantially equal forward energy. Upon the roller 65 reaching the slope-walled end 71 of groove 54, it is cammed upwardly by the slope and out of the groove, causing roller 66 to be lowered into a groove of the set 55 through the connection of rock arm 67 between said rollers. Upon the next rearward thrust of the carriage 42, the camming roller 66 then cooperates with a camming groove 55 to perform the same function as described above for roller 65 in groove 54, groove 55 being provided with a sloped end 71a similar to end 71. (Also see Fig. 27a.)

During the operation of the gun, which will be considered in greater detail subsequently, the above-mentioned rearward or recoil thrusts imparted to the carriage are the recoil impulses resulting from the firing of the gun, and during its normal operation the first firing of a burst is had by one round from one barrel only (e.g. the upper barrel 40), while the last firing thereof is had from the other barrel only, each intermediate firing being of two simultaneously fired rounds (one from each barrel). Thus, with the carriage at rest and in battery position, one round is fired driving the carriage back with the recoil impulse of one round less the forwardly directed hold-forward force, and through the above-mentioned translation of energy is returned toward battery position with substantially the same energy plus that of the hold forward. Upon the gun approaching battery position, two rounds are simultaneously and automatically fired, the impulse of one round being substantially dissipated in counteracting the counter-recoil energy of the previous firing, and the impulse of the other round imparting a recoil thrust to the carriage of substantially the impulse of one round. Each subsequent intermediate firing results in the same action of impulses until the last firing of the burst, at which time only one round is fired. The recoil impulse of this last single round firing substantially balances the counterrecoil impulse of the previous firing to bring the carriage to a halt in readiness for the next burst. The above-mentioned and subsequently described hold-forward means is employed to insure an in battery rest position after a final firing of a burst in the event of a slight unbalance of recoil impulses and despite friction and other losses.

The detailed construction of the camming rollers 65 and 66 and block 58 is illustrated in Fig. 7. The shaft 56 is provided with roller 65 shouldered between the head of pin 56a and sleeve 68, and shaft 57 is provided with roller 66 shouldered between the head of pin 57a and sleeve 69. The lower edges of these rollers are rounded off so that they may smoothly climb the sloped ends of the camming grooves. The pins 56a and 57a are retained within their respective sleeves 68 and 69 by any suitable means such as by friction of a roll pin, force fit, or the like. The forward end of the rocker arm 67 engages sleeve 68 supporting the shaft 56, and the rear end engages sleeve 69 supporting the shaft 57. Since the rocker arm 67 is centrally pivoted on pin 70 which is supported at each end by the block 58, it will be apparent that upward movement of shaft 56 causes a downward movement of shaft 57 and vice versa. A suitable spring pressed detent 58b, including a ball and spring arrangement, serves to retain the rocker arm in one position or the other with one camming roller always in engagement with a camming groove.

Hence, the recoil movement of the carriage and the rotatable breech mounted thereon results in an opposite and forward movement of the block 58 with respect to the breech, and as heretofore described causes a reversal in the direction of recoil impulse, a substantial halving of the overall extent of recoil action, and a rotation of the breech. In the embodiment here described, each recoil and counterrecoil cycle rotates the breech ⅛ of a revolution, as determined by the positions and shapes of the camming grooves. In operation, when roller 66 reaches in the incline 71a and rises thereon at the completion of a recoil and counterrecoil cycle, the rocker arm 67 is actuated to force roller 65 into one of its corresponding grooves 54. Thereafter, roller 65 and a groove 54 control the next rotational operation of the breech 50, so that upon a subsequent recoil the forward roller 65 riding in its groove would cause the rotatable breech to again move ⅛ of a revolution. Each such ⅛ revolution of the breech registers the next opposite pair of firing chambers 53 with the gun barrels 40 and 41, and is here termed an indexing action.

It will be noted that by the above-described operation two important functions result from each recoil and counterrecoil cycle: first, the rotatable breech 50 is positively and accurately indexed to bring the next pair of firing chambers into alignment with the gun barrels; and second, the recoil impulse is changed from a longitudinal rearward recoil impulse to a rotary impulse or torque of the rotatable breech, and thereafter is returned in a longitudinal forward counterrecoil direction with a substantial reduction in recoil distance as compared to that obtained in conventional guns. The carriage and other reciprocating parts of the gun are thus rapidly returned toward battery position and the gun is prepared for another firing. The next firing is initiated automatically upon the carriage approaching battery position and operates to counteract the counterrecoil impulse of the previous firing, as will become more apparent from subsequent discussions. Thus, with the parts properly designed, a large portion of the recoil impulse does not impart a high trunnion reaction because of the cancellation of the counterrecoil impulse and the necessity for large and cumbersome recoil springs, chambers, counterrecoil springs, and buffer arrangements for each cycle of operation are thereby eliminated.

The ammunition feed and gun loading system and breech obturation

The present gun is designed to employ belted ammunition which may be fed into position in alignment with the rear of the firing chambers in the revolvable breech 50 by the indexing operation above-described, and thereafter explosive means or gas pressure may be employed to forcefully project or ram the rounds into these chambers. As best illustrated in Fig. 7 and as previously described, the breech is mounted on shaft 52 and is rotatable therewith but relatively slidable therealong, as provided by the straight spline connection therebetween. As shown in Fig. 16, the enlarged rear end 73 of this shaft may be supported by a suitable thrust bearing 74 comprising spaced annular ball races 75 and 76. The bearing 74 also includes a flanged bushing 77, about which said races are positioned, threaded at its rear end to receive a spanner nut 78 which lies in a recess in the rear wall 79 of the receiver 80 and secures the races and bushing thereto. The enlarged rear end 73 of shaft 52 is secured to the races, bushing, and receiver rear wall by cooperation between the annular race bearing block 77a and a spanner nut 78a, the bearing block being interposed between said races and abutting a suitable shoulder formed at the rear of shaft 52 and the spanner nut being tightened into a suitable recess therefor in the end of shaft 52 to bring the bearing block and the rear end of shaft 52 into secure abutment. Since the receiver 80 and its rear wall 79 are fixed in position and mount the entire gun, the splined shaft 52 is thus restrained against axial movement, so that the carriage 42 and the rotatable breech 50 move back and forth over the shaft and within the receiver casing 80.

Figure 11:
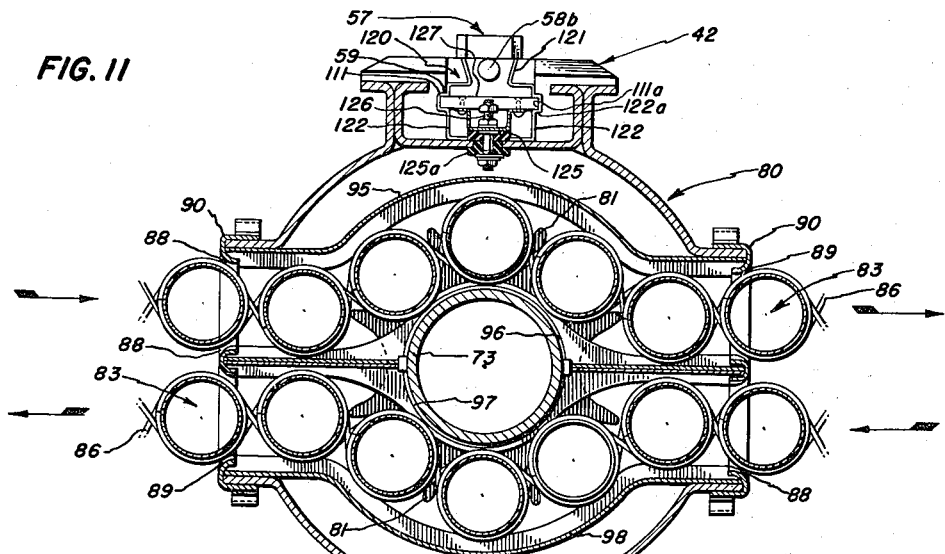
Fig. 11 is an enlarged cross section through the ammunition feed mechanism and taken along a line substantially corresponding to line 11—11 of Fig. 16.

The enlarged rear portion 73 of the shaft 52 is provided with a pair of spaced star wheels or sprockets 81 and 82, the teeth of the star wheels being so arranged that the intertooth spaces register with the chambers in the rotatable breech 50. Because the splined shaft is rotatable with the breech these star wheels rotate in fixed relation to breech rotation, so that a belt of ammunition such as is indicated in Fig. 6 may be engaged by the star wheels and moved over the top thereof into alignment with the rear of the firing chambers. A second belt may simultaneously be drawn in the opposite direction under the star wheels, thus providing separate ammunition belts for the upper and lower barrels of the gun. To facilitate positive control of the ammunition belts by the star wheels, there are provided a plurality of guide rails 91, 92, 93, 94, 95, 96, 97, and 98 cooperating with said star wheels and forming suitable guide chutes for said belts. (See particularly Figs. 16 and 11.)

One form of a suitable ammunition belt is illustrated in detail in Figs. 12, 13, 14, and 15, in which it is shown to comprise a number of spaced projectors or cartridge holders 83 of generally tubular contour, with flared mouths 84 at their forward ends and propelling or primer caps 85 at their closed rear ends. The projectors or cartridge holders may be secured together by any suitable means, such as links 86 which are illustrated as formed of wire and comprise a number of formed wire loops shaped to embrace the outside of a projector and to be connected with the next adjacent projector. One projector or cartridge holder is inserted in loop 86a, then the three loops 86b are sprung together to provide coincident openings into which a second projector is inserted. The second projector also has its own link mounted thereon to provide for attaching a third projector to the belt, etc. The primer caps 85 may be electrically fired through suitable contracts as each projector tube 83 moves into load position in alignment with a firing chamber in the rotatable breech 50, explosively propelling the round carried by the projector into said chamber, as will be subsequently described in detail. Each of the projector tubes 83 may be provided with indentations 87 or the like for holding a round positioned therein against accidental removal, three being provided in the embodiment shown. These indentations cause the projector tube to resiliently grasp the round within the tube and retain it in place until it is forcefully ejected by the force resulting from explosion of the primer cap 85, or by other high pressure gas discharge as may be desired.

The receiver 80 substantially encloses the gun operating parts and has suitable ammunition belt ingress and egress slots 88 and 89 described in guide plates 90 (see Figs. 1 and 11) provided adjacent the rear end of the receiver, and on each side thereof. These slots need be only slightly longer than the overall length of the projector tubes and rounds. In the embodiment illustrated, the revolving breech and star wheels rotate clockwise when viewed from the rear as a result of recoil action, and hence on the left side one belt is fed in through the top slot 88 while the other belt emerges through the lower slot 89; on the right side the opposite condition prevails. As is apparent, the gun may be operated in the reverse direction of breech rotation if desired by merely forming the slope-walled ends of the camming grooves at the opposite ends from those shown in the drawings. By any simple expedient as will be apparent to those skilled in the art, the camming slots may be provided as to make the slope-walled ends thereof interchangeable, leaving the direction of breech rotation readily optional.

Referring particularly to Figs. 16–19, suitable electrical contact means are provided for engaging and firing the primers or caps 85 at the desired moment, so as to detonate them and propel the rounds into the firing chambers as they arrive at load position. To this end, a spider 99 with a plurality of radially extending firing contact arms is applied to the shaft 52 for rotation therewith behind the star wheels. Said radially extending arms are aligned with the intertooth spaces of the star wheels and register with the primer portions 85 of the projector tubes as they are cradled in said intertooth spaces. These arms are each provided with a suitable insulating bushing 100 in which is mounted a freely slidable contact or firing pin 101. The rear ends of these pins are so positioned as to engage flat camming springs 102 and 103 supported on insulating buttons 102a and 103a, spring 102 cooperating with the upper ammunition belt and spring 103 cooperating with the lower belt. The buttons are grooved to enable each to engage opposite sides of holes provided therefor in the receiver rear wall 79. As a projector tube moves into alignment with an arm of the spider, the pin 101 therein is cammed axially forward by action of spring 102 or 103 so as to come into contact with the primer 85. A projector firing current may be imparted to the pin by contact thereof with wiper shoes 104 or 105 (104 for the upper belt and 105 for the lower belt), so that at the desired instant (10° before the breech stops rotating during an indexing cycle), when the shell is properly aligned with a firing chamber in load position, the loading cap is fired through wiping contact of the side of the pin with a wiper shoe. In the event the direction of breech rotation and ammunition belt feed are reversed, the load positions are thus altered, and to accommodate the loading operation thereto the springs 102 and 103 are shifted 90° and the contact shoes 104 and 105 are moved 90° from their respective insulating supports 106 and 107 to other supports 108 and 109.

Referring now to Fig. 6, it will be noted that with the upper ammunition belt moving to the right as indicated by the arrow, when a cartridge bearing projector approaches "load" position in alignment with the empty firing chamber positioned about 55° counterclockwise from the vertical of the gun, its cap 85 is fired by contact of pin 101 with the electrical wiper shoe 104 as above-described, projecting the cartridge into the particular firing chamber 53 which is in alignment therewith during the remainder of the indexing cycle as this firing chamber rotates from the above position to 45° counterclockwise from the vertical of the gun. Thereupon, indexing movement of the rotatable breech 50, as accomplished by firing of the preceding rounds now in alignment with the barrels, brings the newly loaded chamber into alignment with the upper barrel 40 ("fire" position) and brings the primer of the round loaded therein into contact with a suitable upper barrel firing pin 110 mounted in the rear vertical carriage member or breech block 47 (see Figs. 7, 8, and 9), to be described in detail in the discussion of "The electrical control and firing system." To further insure a proper positioning of the round in the firing chamber before it is fired, the forward face of the rear carriage upright 47 is provided with a suitable cam surface 47b about the firing pin position to wedge the shell securely into its slightly tapered firing chamber as the breech rotates the shell into alignment with the firing pin and barrel. After this round has been fired, the indexing action of the rotatable breech 50 resulting therefrom rotates this fired cartridge case containing firing chamber clockwise 45° and beyond the vertical carriage member 47 to "eject" position; whereupon, the empty case is ejected from the gun into its original projector tube, as will become more fully understood from the subsequent discussion of the ejection system, the projector tube having been maintained in alignment therewith by the star wheels 81 and 82. The cartridge case is thus carried clear of the gun by subsequent indexing actions thereof. The lower ammunition feed and gun loading system is identical in construction and operation to the upper, except it is arranged for opposite direction of belt feed.

If desired, any suitable means, as will be apparent to those skilled in the art, may be provided to stop the operation of the gun and lock it in position in the event a round has failed to leave its projector tube and load in its appropriate firing chamber during the "load" portion of the operational cycle. Likewise, means may also be provided for a similar locking operation if an empty cartridge case or dud round fails to eject during the "eject" portion of the cycle. In either event, the gun may then be stripped to the desired point, as will be described subsequently, and cleared to permit continued operation. Alternatively, to prevent a failure of the gun when a round fails to load, the ammunition belt and belt controlling means may be moved sufficiently rearwardly so that the nose of a nonprojected round can clear the rear carriage upright 47.

In operation, to initially place the ammunition belts into operating engagement with the star wheels 81 and 82, the pins 128a (see Fig. 1) are removed to enable relative movement between the receiver casing 80 and the internal parts of the gun including the carriage 42 and the breech 50, as will be described subseqently, the former moving rearwardly relative to the internal portions of the gun. However, the shaft 52 and its enlarged portion 73, being attached to the rear plate of the receiver, move relatively rearwardly therewith. This relative movement may be had to the extent necessary to disengage the splined connection between the breech and shaft 52, thus leaving the star wheels 81 and 82 freely rotatable independently of the breech and other movable parts of the gun. After removing the first round from its projector in each of the ammunition belts, these belts may be readily fed through the openings 88 and 89 in the side plates 90 of the receiver until the emptied projectors are in alignment with their respective barrels, the next succeeding projector in each belt being in position to load its round into the appropriate firing chamber. The gun is then reassembled and the pins 128a replaced to establish the gun in readiness for operation.

The use of an explosive cap or high pressure gas to load rounds into the firing chambers, as above-described, has the obvious advantage over mechanical loading of greater rapidity of operation. In addition, prior guns have been limited in their bullet ramming speeds because of the sharp mechanical impact between the bolt and the bullet being loaded. A limit of ramming speed is thus impressed on such mechanisms above which undesirable damage is inflicted on the bullet. Although the present method of loading is a high speed operation, in explosion or gas pressure loading the bullet is accelerated and decelerated relatively gradually, thereby permitting higher speeds of loading and yet eliminating the undesirable damage to the bullet that would otherwise result. Particularly when aluminum cartridge cases are used, the scratching thereof resulting from bolt loading seriously and deleteriously affects the strength thereof. However, since in the present invention the cartridge case is not touched by any mechanical ramming means, aluminum may be readily used therefor. A still further advantage derived from gas loading as contrasted with bolt ramming of rounds is that the gradual acceleration and deceleration does not unduly dislodge the propellant explosive, yielding more accurate ballistics characteristics than are obtained by mechanical loading means.

Since the present gun is provided with a breech rotatable with respect to the barrels, a problem is presented in breech obturation. To provide for the sealing thereof, an obturator sleeve 172 is provided in the forward end of each firing chamber, and the rear ends of said firing chambers are formed with a slight decreasing taper in the forward direction, as best shown in Fig. 7. The obturator sleeves 172 are longitudinally slidable in their firing chambers to abut the rear ends of the barrels 40 and 41 upon the firing of a round, and thus effectively seal those ends against gas escape. The cartridge casings are also slightly tapered in the forward direction as indicated in Fig. 7 to coincide with the contour of the firing chambers. When tightly wedged into the firing chambers, these casings provide a gas seal at the rear ends of said chambers. Thus, the combination of the wedged casings and obturator sleeves provide the breech of the present gun with a complete seal against gas escape.

*The gun charging, buffing, ejection, cooling, and hold-forward systems, and field stripping*

Figure 29:
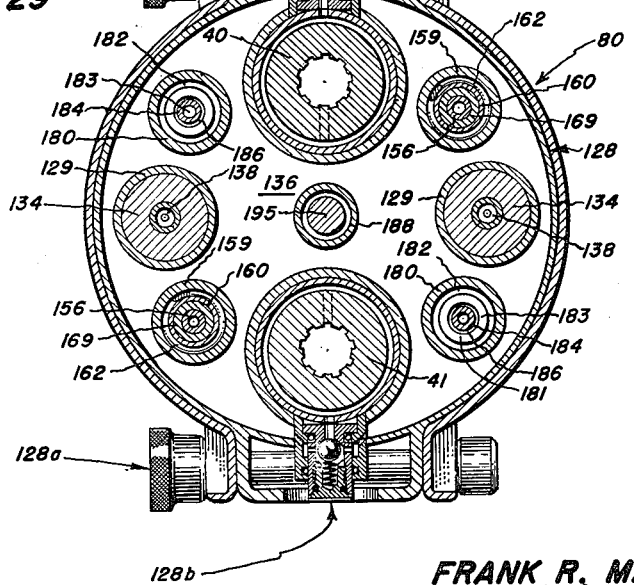
Fig. 29 is a vertical cross-sectional view through the compressed gas flask or tank taken along a line substantially corresponding to line 29—29 of Fig. 23 which corresponds in location to line 29—29 of Fig. 30.

As previously described, the indexing operations of the present gun are effected by the recoil impulses imparted to the carriage. However, it is apparent that some means must be provided to initially move the carriage to recoil and back toward battery position in order to initially load or charge the gun, or to accomplish a sufficient number of indexing cycles as will place at least one round in alignment with a barrel in firing position, so that a firing may occur to carry out subsequent indexing cycles under recoil power. The gun charger of the present invention used to initiate the indexing action thereof is particularly illustrated in Figs. 30, 34, and 35, in addition to the external views thereof shown in a number of the general views. Referring particularly to Fig. 34, this charger mechanism is shown mounted in a housing sleeve 129 extending through a compressed gas tank 128, the tank being held in fixed position by the forward end of the receiver 80 (see Fig. 1) through the pins 128a. The tank 128 is initially charged to the desired gas pressure through a valve represented by the numeral 300 and is maintained at that pressure by the explosion gases of the rounds fired, the barrels passing through the tank and their interiors being connected to the tank through one-way spring pressed ball check valves 128b, best shown in Figs. 7 and 29.

Sleeve 129 is suitably fixed in place and has a central inwardly projecting annular shoulder 130. The rear portion 131 of the sleeve protrudes from the rear wall of the pressure tank. The charger assembly may be introduced bodily through the forward end of the sleeve 129 and includes a solenoid 132, functioning upon being electrically energized to retract a pilot type flow control valve 133 housed within an enlarged portion 134 of the charger tube 135, forming a flange for abutment with the shoulder 130 when the charger is inserted in the sleeve 129. The valve controls the flow of high pressure gas from the interior 136 of the gas tank 128 as it flows through opening 137 past the valve 133 to the central channel 138 of the charger tube 135. The charger tube 135 has intermediate along its length a suitable opening or openings 139 which allow the gas pressure to be transmitted from channel 138 to a charging chamber 140, formed between a buffer sleeve 141 and a charger sleeve 142. Openings 143 in the buffer sleeve 141 register with openings 139 so that the gas from channel 138 may enter the charging chamber 140.

The rear end of the charger tube 135 extends through an opening in the transversely extending pivot shaft 62 and is secured against forward movement relative to the shaft by any quick detachable means, such as the split lock ring 144 having a plurality of circumferential lands 145 cooperating with companion grooves located around the circumference of the rear end of the tube 135. This lock ring is retained in locked engagement by means of a resilient clip 146. A cross section through the lock rings and clip is illustrated in Fig. 27. It is further to be noted that the buffer sleeve 141 bears rearwardly against shaft 62 by the force of the gas pressure entering buffing chamber 147 through opening 148, normally holding shaft 62 in abutment with the lock ring 144. It is this charger mechanism together with its oppositely disposed companion charger mechanism in cooperation with their buffer sleeves which form the previously mentioned intermediate support for holding the shaft 62 in fixed relation to the receiver 80.

As shown in Fig. 30, there are two charger housing sleeves 129 and charger mechanisms, one on each side of the gun, which operate on the forward vertical portion 45 of the reciprocable carriage 42 through the charger sleeves 142. Therefore, admission of fluid into the chambers 140 through operation of the solenoid controlled valves 132 tends to separate the charger sleeves from the enlarged forward portions of the buffer sleeves. Since gas pressure is also admitted to the above-mentioned buffer chambers 147, formed in part by the enlarged forward end of the buffer sleeves, through openings 148 and annular channels 149, there is always a rearwardly directed force exerted against the buffer sleeves to force them into positive contact with the pivot shaft 62. Because of the balancing pressure on buffer sleeves 141 through chambers 147, an increase of pressure in the charging chambers 140 causes the charger sleeves 142 to force the slide rearwardly and thus move all the reciprocable parts of the gun in recoil direction. The rearward movement is terminated by the closing of the solenoid pilot valve 133 and uncovering of charger exhaust ports 150, several of which are provided about the periphery of the charger sleeves 142.

In order to prevent any air or gas which may escape from the pressure tank into the passages 138 while the solenoids are not energized from gradually accumulating in the charger chambers and moving the gun toward recoil position when not desired, a spring opened needle leakage valve 151 is provided at the rear end of each charger tube, each of which includes the needle plunger 152 normally held open by a light tension spring 152a, so that slight leakage into channel 138 is immediately vented to the atmosphere through opening 153. However, the advent of a sudden high pressure within the charger tube channels immediately forces the needle plungers 152 to the right, compressing the relatively weak springs 152a and completely closing openings 153 to enable the pressure to act upon charger sleeves 142 as described above. Also, a small vent passage 154 prevents gas entrapment between the flange 134 on each charger tube 135 and the inwardly directed shoulder 130 of each charger tube housing sleeve 129 as may otherwise result from leakage past the O ring seals.

Thus, when it is desired to operate the gun and no rounds are in the firing chambers aligned with the barrels, solenoids 132 are energized to open the pilot valves 133. High pressure gas is thus applied to the charging chambers 140 to drive the carriage 42 into a rearward recoil direction, the charger mechanisms being so designed as to accomplishe this action with a force substantially equivalent to the recoil impulse of a single round; whereupon, the solenoids are deenergized and the chambers are vented to the atmosphere through openings 150, enabling the carriage to be moved forward back to battery position through the action of the rotatable breench 50 and slide 58, as in the case of the recoil action resulting from the firing of the gun. If on return to battery position, no rounds or dud rounds are in "fire" position, therefore failing to provide a recoil impulse to counteract the counterrecoil impulse resulting from the charger operation, the carriage moves forward past battery position to act on the buffer system (described hereinbelow) and is thereby returned to the in-battery position with sufficient energy to continue through an indexing cycle. This action may continue for several indexing cycles or until a firing of the gun occurs; whereupon the counterrecoil impulse of the buffer action is counteracted and normal operation of the gun proceeds under the force of ammunition generated recoil impulses. In normal operation, however, a round is loaded into each of the two firing chambers in "load" position (see Fig. 6) before the charger is operated. Then, upon indexing action by the chargers these two rounds are brought into "fire" position and are both fired, the recoil impulse of one round substantially cancelling the counterrecoil energy of the charger action and the recoil impulse of the other round driving the carriage again into recoil and indexing action. The remaining firings of the burst may then continue in the normal manner as previously indicated. During chargging, the ammunition feed, ammunition loading, and indexing operations are accomplished in the same manner as during actual firing of the gun. A more complete understanding of the operational functions of the charging system will be had from a consideration of the section entitled "The electrical control and firing system."

The above-described arrangement of parts not only provides a charging mechanism, but the chambers 147 with high pressure gas admitted through openings 148 and channels 149 also serve as a buffer system to cushion the counterrecoil motion of the carriage, when it is returned past battery position, against the high pressure gas contained in said chambers. However, this buffer action does not occur during normal operation of the gun, since the recoil impulse of the following rounds fired serves to counteract the forwardly directed counterrecoil energy and reverse the motion of the carriage before the in-battery position is reached. However, in the event a misfire should occur in both barrels during a firing burst, the carriage does continue to move forward past the in-battery position after the limit of pivotability of yoke 61 is reached, causing the pivot shaft 62 to move therewith, sliding along charger tube 135 and against the slidable buffer sleeve 141. The resilient force of the buffer sleeves 141, resulting from the high gas pressure in tank 128, returns the carriage and shaft rearwardly to battery position with substantially the initial recoil energy of the carriage, but somewhat diminished due to friction and other losses, and drives the carriage again into rearward recoil position and back to battery position to effect an indexing action. The breech rotation resulting from this indexing cycle places two new firing chambers in the firing positions to enable resumption of firing without operation of the chargers.

Two identical ejection systems are employed to eject the fired cartridge case or dud rounds from the firing chambers and are best illustrated in Figs. 25, 26, 31, 31a, 32, 32a, 33, 33a, and 35. Referring first to Fig. 35, it will be noted that in each ejection system the ejector tube 156 registers with one of the two firing chamber positions for chambers containing the fired cartridge cases which have been rotated 45 degrees clockwise from the vertical of the gun and clear of the rear vertical member 47 of the reciprocable carriage. The ejector tubes 156 are united with the forward vertical upright 45 of the carriage through the ears of charger sleeves 142 and the enlarged sleeves 187 affixed to said tubes and interposed between pairs of said ears, and therefore the tubes reciprocate with said carriage. When the reciprocation of the carriage brings the openings 155 and 170 into registry, high pressure gas from tank 128 enters the hollow bores of ejector tubes 156, through which it passes into the front ends of the firing chambers in the above-mentioned positions. The fired cartridge cases 157 are thereby forcefully returned to their original projector or carrying tubes 83 and carried out of the gun with the movement of the ammunition belts.

Considering only one ejection system for the purposes of illustration, Figs. 31 to 34 inclusive illustrate in detail the valve employed to control the flow of ejection gas. As illustrated in Fig. 31, the interior 136 of the pressure tank 128 communicates through opening 155 with the interior of a housing 159 containing the shutoff sleeve 160. The sleeve 160 is normally urged to the left extent of its travel by spring 162, so that its end bears against plug 163 affixed in the end of the housing tube 159, and an inwardly directed abutment 165 is located at the right end of the shutoff sleeve 160 which is engaged by a block 166 secured to the outside of the recoiling ejector tube 156, so that reciprocation of the tube with the carriage, as the gun moves between firing and rearward recoil positions, causes the block 166 to engage the abutment 165 rapidly and repeatedly with the rearward recoils of the carriage, to drive the shutoff sleeve to the right against the compression of the spring 162 into the position shown in Fig. 33. In this position the channel 164 connecting with the port 167 is in registry with the opening 155 in housing 159, allowing high pressure gas to enter the inside of the shutoff sleeve 160 and pass through port 168 in the stationary plug 163. When port 170 in the recoiling ejector tube 156 registers with port 168, the high pressure gas flows from the tank through the ejector tube to the forward end of the firing chamber in registry therewith, where it may be forcefully emitted from the tube through an axially slidable seal 171 positioned in the breech faceplate 50a, which is thus forced into sealing bearing against the forward end of the obturator sleeve 172. The high pressure gas thus forced into the forward end of the firing chamber drives the fired cartridge case 157 or dud round rearwardly and propels it into its original projector or carrying tube 83.

In actual operation, during a firing burst of the gun the shutoff sleeve 160 hovers with its channel 164 in registry with ports 155. This is accomplished by a dashpot arrangement comprising a reduced portion 173 of the plug 163 providing a dashpot chamber 174 (see Fig. 33) adjacent the left end of the cutoff sleeve, a small bleed 175 therefor, and a large bleed therefor including the central plug opening 176 and ports 177. When the sleeve is initially moved to the right to the position shown in Fig. 32 (end of rearward recoil motion), the large ports 177 are uncovered thus breaking any vacuum which may have been created in chamber 174 by the sudden movement of the sleeve to the right. Thereafter, as the sleeve attempts to move to the left due to the resilience of the compression spring, it impinges upon the pocket of air which is provided at its end after the ports 177 have been closed. Since the small bleed 175 is insufficient to permit the sleeve to move to the left with any degree of rapidity, the sleeve's return is slowed down and caught by the block 166 on the next rearward recoil actuated reciprocation of the ejector tube 156, causing the sleeve to hover between the full rearward recoil position shown in Fig. 32 and some point after the beginning of operation of the dashpot. Thus, the channel 164 is always maintained in registry with ports 155 during a firing burst of the gun, the opening and closing of the ejector ports 170 being controlled by the in or out of registry condition of said ports with ports 168 as results from carriage reciprocation.

Figs. 25, 26, 31, 31a, 32, 32a, and 35 also show two cooling systems employed to cool the firing chambers after the fired cartridge cases have been ejected therefrom. As illustrated diagrammatically in Fig. 35, each system comprises a coolant inlet from a suitable source, such as an outside line 178, which admits a suitable cooling liquid or other medium, as compressed carbon dioxide, to a coupling element 179 mounted in a suitable sleeve 180, held stationary in any desired manner or by being applied to the tank 128. The flow of coolant fluid is controlled by means of ports 181 formed in channel 182, leading to the annular channel 186, in turn connecting with the interior 183 of a coolant tube 184. Like the ejector tube 156, tube 184 is securely affixed to the forward upright 45 of carriage 42 for reciprocation therewith through the ears of charger sleeves 142 and the enlarged sleeves 187 interposed between pairs of said ears. The details of this coolant valve are shown in Figs. 31, 31a, and 32. Inlet line 178 connects to a suitable fitting 179, into whose axial bore 185 the end of reciprocable tube 184 is slidably fitted and from which, as can be readily seen, coolant enters the forward end of tube 184 when channel 186 is in registry with ports 181, passing along passage 183 of tube 184 to an elongated egress slot 187, shown in elevation in Fig. 25 and in vertical section in Fig. 26, for directing the coolant through the forward end of firing chambers in those chamber positions immediately succeeding the ejection positions. The registry of channel 186 with ports 181 is controlled by the recoil action of the carriage to which the tube 184 is affixed, and is thus shown in Fig. 32 to provide a coolant blast when the empty firing chamber 53 has passed the ejector tube and come into alignment with the coolant delivering tube 184. The shutoff or battery position is shown in Fig. 31. If desired, a suitable lubricant may be intermixed with the incoming coolant so that the firing chambers in the rotatable breech may be lubricated as they are cooled, hence substantially reducing the possibility of a cartridge case seizing in the chamber.

When, as was previously suggested, liquid carbon dioxide is employed as the coolant fluid, the expansion thereof after injection into the emptied firing chambers results in a continuous flow of the gas out the rear of the breech during a burst, even while the coolant valves are momentarily shut off. Besides cooling the chambers this gas further acts as an explosion preventative, minimizing the possibility of such an explosion as might otherwise result during long bursts from the accumulation of combustible gases in the gun bay and fired cartridge casings. The antiexplosion feature of the present gun is further enhanced by the fact that the fired cartridge casings are retained in their firing chambers for a full indexing cycle, rather than being immediately ejected.

As illustrated in Fig. 25, the breech faceplate 50a is provided with eight openings, each aligning with a firing chamber position: two with the firing position, two with the eject position, two with the cooling position, and two blanks plugged with the caps 161 and corresponding to load position. If it is desired to reverse rotation of the breech to counterclockwise action, it is apparent that the two plugged positions must be converted to eject positions and the present eject positions to load positions with plugged faceplate openings. To make the present gun readily adaptable to reverse breech rotation, the coolant and ejection valve mechanisms are readily removable from their respective housing sleeves 180 and 159, by removal of locking pins 158 after the barrels 40 and 41 have been removed (see Fig. 21). Also, as can be seen from Figs. 31 and 32 the above-mentioned housing sleeves are adapted to hold either the ejection or coolant valve mechanisms interchangeably, seals 169 being provided in the coolant valves for blocking nuts 155 when the housing sleeves contain these valves. Thus, by a relatively simple rearrangement of these parts the operation of the gun can be converted for opposite direction of breech rotation.

As best shown in Figs. 30 and 34 a small diameter housing tube 188 is provided along the longitudinal axis of the pressure tank 128, which is welded or otherwise suitably secured in place in both end walls thereof. This tube houses both a gun switch 192 in its forward end, to be described in detail in the following section, and a hold forward sleeve 195 slidable therein and on the piston 200. The sleeve 195 has a hollow interior 196 and is flanged at its rear end at 197 to engage the rear face of the forward carriage upright 45 with which it reciprocates. The rear flange of the carriage hold-forward sleeve 195 is retained in abutment with the upright 45, and continuously urges the carriage forward as a result of the application of the gas pressure contained in tank 128, through opening 198 in tube 188, opening 199 in the hold-forward sleeve 195, and the intermediate annular channel 199a formed between the sleeve 195 and tube 188, upon the forward end of the sleeve and against the face of piston 200. The rear end of piston 200 abuts the block 201 carried by the pivot shaft 62.

One purpose of this hold-forward arrangement is to prevent the carriage from moving to the rear of battery position and to maintain it in readiness for operation when the gun is at rest, by overcoming rearward "g" and other loads that might act thereon, as for example those resulting from maneuvers of the craft in which the gun is mounted. (The carriage is prevented from moving forward of battery position when at rest by the above-described buffer system.) Also, the constant forward pressure thus exerted on the carriage operates to correct any tendency of the carriage to recoil upon completion of a firing burst, as may result from unequal recoil impulses of different rounds, or friction losses, or the like. The hold-forward force thus exerted does not affect the normal recoil and counterrecoil actions of the carriage, since it is preferably small as compared to the recoil impulse of a round, and its opposition to the recoil portion of the indexing cycle is balanced by its addition to the counterrecoil portion.

As will be seen from the following description, one highly desirable feature of the present gun is that it may be readily field stripped without the use of elaborate ordnance tools. In so doing, the spanner nut 78 recessed in the rear wall of the receiver casing (see Fig. 16) and the pins 128a securing the gas tank to the forward end of the receiver (see Fig. 1) are first removed, thus enabling the receiver casing to be slid rearwardly and entirely removed from the gun mechanism, or the gun to be slid forwardly and entirely extracted from the receiver, thus completely exposing the mechanism. Once this is done, shaft 52, its enlarged extension 73, and the star wheels 81 and 82 (see Figs. 7 and 16) may be removed by sliding this assembly rearwardly with respect to the breech and carriage. Or if desired, the receiver and shaft 52 may be simultaneously disassembled from the gun if nut 78 is not removed. After removing the barrel retaining pins 40a and 41a (see Fig. 7), the two barrels may be rotated a fraction of a turn to disengage the interrupted threads thereon from those formed in the barrel receptacle openings in the carriage, thereby enabling the ready removal of the barrels. After the gas in the tank is bled, as may be done through valve 300, the spring clips 146 may be removed from the rear ends of the charger mechanisms (see Figs. 27 and 34) enabling the removal of the split lock rings 144 to permit the charger tubes to be removed forwardly from their housing tubes in the gas tank. The buffer sleeves 141 are next moved forwardly onto the rear portions 131 of sleeves 129, enabling the pivot shaft 62 to be knocked free from the yoke 61 and the block 201, leaving the assemblies of buffer sleeves 141 and charger sleeves 142 free to be removed from the carriage. The removal of sleeves 142 eliminates the restraint exerted thereby through the ears thereof on movement of coolant and ejector tubes 184 and 156 relative to the carriage, as provided by the sleeves 187 united to the tubes 156 and 184 and interposed between said ears, thus enabling the complete disassembly of the gas tank, cooling valves, and ejector valves as a unit from the carriage. Next, the bearing blocks 64 (see Fig. 2) are knocked out, allowing the yoke to drop and to expose the pin connecting rod 60 to the top of the yoke. The removal of this pin permits the disassembly of the yoke. Finally, by proper manipulation of the camming block 58, the camming pins thereof, and the breech, utilizing both the camming grooves 54 and 55 and the relief cuts 54a and 55a for receiving the camming pins (see Figs. 2 and 7), the breech may be removed from the carriage, leaving the camming block 58 removable out the rear ends of the guide grooves 59. Thus, the gun is disassembled into its component parts, and its reassembly is effected by a reversal of the disassembly steps. The absence of nuts, bolts, or other screw threaded parts, and the absence of any springs that need be compressed for assembly or disassembly make the field stripping feature of the present gun a significant improvement over the prior art. This advantage being in the main the result of the present method of absorbing and counteracting the recoil forces.

The electrical control and firing system

Referring to the wiring diagram of the present gun, Fig. 36, the electrical control and firing system can be seen to comprise a power source 250, such as a battery, operating the motor 251 and the three relays 256, 260, and 262. The motor 251 operates a generator 252, which stores a charge upon the condensers 266, 268, 270, and 272 through the resistors 265, 267, 269, and 271 respectively in series therewith. The above-mentioned several relays function in part to control the application of the charges stored on condensers 266 and 268 to the two ammunition firing pins 110. Also, the power source 250 supplies power to operate the gun charger control solenoids 132, as controlled by the action of the above-mentioned relays. A gun switch 192, operated by the recoil movement of the carriage, cooperates with the above-mentioned relays in controlling the application of the charge stored on condenser 268 to the lower barrel ammunition firing pin. A cyclic rate timer 254 is further provided in this circuit, which may be connected in electrical parallel relationship with the firing switch 255, for controlling the rate of two round bursts of the present gun.

The projector firing means are shown in Figs. 16, 17, 18, and 19, and the gun charger control solenoids are shown in Fig. 30, both of which have been described in detail above. The electrical connections to the projector firing means is had through the intermediary of the binding posts 126a and 126b affixed to the receiver casing by the insulating plate 125 and bushings 125a shown in Fig. 16. The ammunition firing pins 110 and their associated structure are best shown in Figs. 7, 8, and 9. Referring thereto, the upper and lower ammunition firing means being identical in construction and mounting, the following description of one is therefore equally descriptive of the other. The pin 110 is mounted for longitudinal sliding movement in the insulating sleeve 112. Electrical contact is had with the rear end of the pin 110 by the resilient electrically conducting strip 114 and its electrically conducting extension element 116, both suitably insulated from the rear carriage upright 47 in which they are mounted by the bushing 118, as shown in the drawings. The lead connecting binding post 126 is fixed in position by being attached to the receiver casing and suitably insulated therefrom by plate 125 and bushing 125a. An electrically conducting channel plate 124 is affixed to the binding post 126 and carries a resilient electrically conducting circuit making and breaking clip, shown in the drawings as comprising two spring arms 123 designed to resiliently engage the connector 116. The above-mentioned insulating bushing 118 which carries the resilient strip 114 and its extension 116 is removably held in its seat by the resilient mounting clip 120, shaped on its sides to provide the extending exterior shoulders 111 for engaging the channels 59 formed along the length of the upper longitudinal guide member of the carriage, and having finger grips 121 to facilitate positioning and disengagement of the above-mentioned shoulders in and from the grooves 59 for positioning or removal of the clip, bushing 118, and the electrically conducting elements carried thereby. An insulating slide plate 127 is affixed to the channel plate 124 and is so shaped as to provide a sliding fit in the inner grooves 111a of the resilient clip 120, forming the inner counterpart of the above-mentioned outside shoulders 111. With the resilient clip 120, carrying the insulating bushing 118, the spring strip 114, and the extension element 116 therefor, snapped into place as shown in the drawings, the insulating slide plate 127 slides in the above-mentioned side grooves 111a of the clip relative to the carriage as the carriage moves in its recoil and counterrecoil cycle, providing for alternate engagement and disengagement of the element 116 by the resilient spring clip arms 123. There is thus provided an electrical connection between the binding post 126 and the primer of the round moved into alignment with the barrel, contact being made with element 116 slightly before, slightly after, and in battery position, the circuit otherwise remaining open as a result of the carriage movement. Positive contact between the pin 110 and the round aligned therewith in readiness for firing is afforded by the resilience of the strip 114.

The gun switch 192 is shown in detail in Fig. 30 and is operated by the hold-forward sleeve 195 to be closed near the rearward limit of recoil travel of the carriage and to be open during all other portions of the carriage travel. An insulating plug 189 is fixed in the forward end of the hold-forward housing tube 188 and carries the binding posts 190 and 191 extending outwardly from the tube 188. A pair of electrically conducting contact elements 190a and 191a are connected to the binding posts 190 and 191 and extend rearwardly into the hold-forward tube 188, while an insulating rod 194 is affixed to the closed forward end of the hold-forward sleeve 195 for reciprocation therewith between said contact elements. An electrically conducting band 193 is affixed to the insulating rod 194 substantially adjacent its forward and free end. The rear ends of the contact elements 190a and 191a are each provided with rod engaging projections 193a, so that when the carriage has moved to the rearward extent of its recoil travel, the hold-forward sleeve 195 and the insulating rod 194 moving therewith, the electrically conducting ring 193 is interposed between the contact element projections 193a to close the gun switch by completing the electrical circuit between the two binding posts 190 and 191. During all other portions of the recoil and counter-recoil travel of the carriage, the contact projections 193a engage the insulating rod 194 rather than the electrically conducting ring 193, leaving the circuit between the two binding posts open.

Referring again to Fig. 36, it will be readily apparent that closure of ready switch 253 operates to energize the motor 251 from the power source 250 and to energize the charger relay 260, causing its switch arm 261 to break from its contacts 261a. Energization of the motor 251 operates the generator 252 to charge the condensers 266.

268, 270, and 272. If at that moment two projector or ammunition carrying tubes 83 are in load position, the projector contact shoes 104 and 105 contact the projector firing pins 101 to fire the projector primers 85, loading these rounds into the firing chambers in alignment therewith and rotationally preceding the fire positions. So long as ready switch 253 is maintained in closed position, rounds brought into the load positions are thus automatically loaded into the appropriate firing chambers. With the carriage in battery position, two rounds loaded in the firing chambers rotationally preceding the firing positions, and no rounds positioned in those chambers in the fire positions, if the firing switch 255 is then closed with the ready switch 253 maintained in closed position, upper barrel relay 256 is immediately energized causing its switch arm 257 to engage contact points 257a, its switch arm 258 to break from contact points 258a, and its switch arm 259 to engage contact points 259a. With the switch arms in this position, the charged condenser 266 would fire a round from the upper barrel 40 if one were there in fire position. But since that firing chamber is empty, that circuit remains open. The breaking of switch arm 258 from its contact points 258a deenergizes the charger relay 260, but this relay being designed to return to normally biased position with its switch arm in engagement with contact points 261a after a short time delay, the circuit to the gun charger control solenoids 132, which would otherwise be closed by the closure of switch arm 259 to its contacts 259a, remains open. However, after the lapse of the time interval required for relay switch arm 261 to return to its normally biased position in engagement with the contacts 261a, the gun charger control solenoids are energized, causing the previously described charger mechanisms to drive the carriage through a recoil and counterrecoil cycle. As the carriage approaches the rearward limit of recoil travel the gun switch 192 is closed, which immediately results in energization of the lower barrel relay 262 causing its switch arms 263 and 264 to engage their respective contact points 263a and 264a. The closure of switch arm 263 would fire a round in alignment with the lower barrel 41 by connecting the condenser 268 thereto through the lower barrel firing pin 110, but no round is as yet positioned there. With switch arm 259 of upper barrel relay 256 held closed to its contacts, the closure of the switch arm 264 of the lower barrel relay 262 operates to reenergize the charger relay 260, again breaking its switch arm 261 from its contacts 261a to deenergize the charger solenoids 132. The switch arm 261 is held in open position so long as switch arm 264 and switch arm 259 are held closed to their respective contacts. After the carriage passes the rearward limit of recoil travel and starts forward in a counterrecoil motion the gun switch is opened, but lower barrel relay 262 being designed for a time delay in its return to normally biased position, remains in its coil energized position with its switch arms 263 and 264 closed to their respective contact points. Thus, when the carriage approaches battery position a round is aligned with each of the two gun barrels and both are immediately fired by the charges carried on the condensers 266 and 268, connected to the rounds through switch arms 257 and 263, respectively. The time delay return action of lower barrel relay 262 and charger relay 260 are such as to maintain the relays in energized position after deenergization of their coils for a period of time exceeding the time required for one indexing cycle of the gun.

Thus, upon the firing of the two rounds above-mentioned, the recoil force of one of these rounds counteracts the counterrecoil force resulting from operation of the charger mechanisms, while the recoil force of the other round operates to drive the carriage into another indexing cycle with the recoil force of one round. Since the gun switch is closed on each recoil action to energize the coil of the lower barrel relay 262, so long as the firing switch 255 and ready switch 253 are held closed the rounds are continuously loaded into the firing chambers of the breech and pairs of the rounds are simultaneously and automatically fired from the gun, the switch arms of the barrel relays 256 and 262 being continuously held in energized position. To end the firing burst the firing switch 255 is opened, immediately deenergizing the upper barrel relay 256 and energizing the charger relay 260 through the closure of switch arm 258 to its contact points. But slightly before the carriage reaches battery position on the indexing cycle resulting from the previous firing of a pair of rounds from the gun, since the switch arms 263 and 264 of delayed action relay 262 are held closed to their contact points during this time despite the opening of the firing switch, the round aligned with the lower barrel 41 as a result of the last indexing cycle is fired, providing a recoil impulse of one round to counteract the counterrecoil energy of the previous firing and to bring the operation of the carriage to a halt, there being substantially no resultant net recoil energy to drive the carriage into recoil position as had previously resulted from the second round of each pair fired.

The gun now being in the condition of having a single round aligned with its upper barrel and a fired cartridge case aligned with its lower barrel, a subsequent closure of the firing switch 255 energizes the upper barrel relay 256 and results in an immediate firing of the round aligned with the upper barrel to drive the carriage into a recoil and counterrecoil cycle with the impulse of a single round. The recoil action of this round closes the gun switch during recoil travel of the carriage to energize the lower barrel relay 262 and thus permits the gun to continue firing in the manner above-described. The charger relay switch arm 261 is held away from its contact points 261a during this entire burst as is apparent from the previous analysis of the circuit.

In the event that during a burst two dud rounds or two misfires should simultaneously occur, there being no counteracting recoil impulse to check the counterrecoil energy of the carriage as it comes into battery position, the carriage continues past battery position and into buffing. The previously described buffer mechanism resiliently cushions the shock that would result from the counterrecoil energy and thus operates to drive the carriage through another indexing cycle on its return therefrom. Since the firing switch is maintained closed and since the gun switch again closes at the end of rearward recoil travel of the carriage, the gun continues to operate and two new rounds are aligned with the two barrels, which are fired during the return of the carriage to battery position, the three relays being thus held in their normal operating position. There therefore results no interruption in the operation of the gun. If, however, during a burst one of the two rounds aligned with the barrels should fail to fire, the firing of the single round counteracts the counterrecoil energy and brings the operation of the gun to a halt. But if the firing switch 255 is continued to be held in closed position, the lower barrel relay 262 and hence the charger relay 260 shortly return to their normally biased position, causing the gun charger control solenoids to be energized and resulting in an indexing action under the operation of the charger mechanisms. The result thereof is the same as the above-described initial operation of the gun, the switch arms of the lower barrel relay 262 being closed and the charger relay switch arm 261 being therefore broken from its contacts 261a upon the carriage reaching its limit of rearward recoil travel, enabling continued automatic operation of the gun.

When the gun is operated through the firing switch 255, it is apparent that the rate of fire is controlled solely by the rate of mechanical cycling of the carriage. When a lesser rate of fire is desired, the firing switch is left open and the present circuit is closed through the cyclic rate timer 254 and its control switch 254a, which provide for opening and closing of the present circuit at a desired adjustable rate. As will be apparent to those skilled in the art, with each closure of the circuit by the cyclic rate timer the round loaded in alignment with the upper barrel 40 is immediately fired to cause an indexing action of the gun, and the circuit is automatically opened after closure of the gun switch 192. The return of the carriage toward battery position results in firing that round then brought into alignment with the lower barrel 41 to bring the indexing action of the gun to a halt. Such successive pairs of firing may be accomplished at any desired rate in accordance with the setting of the cyclic rate timer up to the maximum rate of automatic fire as would be obtained by closure of the firing switch 255. In the event that during controlled cyclic rate operation of the present gun a dud round or two dud rounds should be placed in firing position, the results thereof will be apparent from a consideration of the circuit as described in detail above with reference to full automatic firing through the closure of the firing switch 255. Such dud or duds may be cleared from the gun and normal operation thereof resumed by switching from cyclic rate controlled operation to full automatic fire; or if desired, means may be provided to cooperate with the cyclic rate timer 254 in conjunction with the operating portions of the remainder of the circuit and gun so that such normal operation may be resumed under continued control of the cyclic rate timer, as would be apparent to one skilled in the art.

At this point it should be readily apparent that the present gun provides the feature of hang-fire proof construction under all conditions of operation. If after the firing of a burst a second burst is attempted but the round in alignment with the upper barrel is delayed in firing, because of the delay in operation of the charger relay the charger mechanisms do not initiate an indexing cycle until a sufficient time interval has elapsed to permit the hang-fire to be propelled. Thus, it is insured that the hang-fire fires while that round remains aligned with a barrel. Also, if during a firing burst one hang-fire becomes aligned with a barrel in firing position and the other round fires normally, the reciprocation of the carriage is thereby stopped, but because of the delay in operation of the charger relay a sufficient time interval is provided to enable the hang-fire to be ignited before a charger operated indexing cycle is initiated. Further, if during a firing burst two hang-fires are aligned with the barrels in firing position, the time interval provided by the carriage sliding forward past battery position into buffing and its rearward return through battery toward recoil position is sufficient to enable the hang-fire to be ignited before the next indexing cycle is started.

Timing of operational cycle

In the normal operation of the present gun, that is in the absence of any dud rounds or misfires and under full speed operation thereof, as effected by the closure of the firing switch 255 rather than under the control of the cyclic rate timer 254, the operation of the gun is briefly as follows: Closure of the ready switch 253 results in the loading of two rounds then in the load position into the firing chambers, placing the gun in readiness for firing. Subsequent closure of the firing switch 255 results in charging of the gun by means of the charger mechanisms to actuate the carriage, barrels, and rotatable breech through one indexing cycle with an impulse equivalent to the firing of a single round. The two rounds previously loaded are thus indexed into alignment with the two barrels of the gun, and shortly before the carriage returns to battery position these rounds are fired. In the meanwhile two new rounds have been loaded in the next rotationally succeeding firing chambers which are indexed into alignment with the barrels and fired as a result of the indexing cycle following the previous firing. The feeding of rounds carried by the projectors is continued in synchronism with the rotation of the breech, and the loading of rounds into the firing chambers and the firing of those so loaded is automatically continued so long as the firing switch 255 is held closed. Upon the opening of the firing switch, the next time the carriage approaches battery position the round aligned with the lower barrel is alone fired to stop the indexing action of the gun, leaving a live round in alignment with the upper barrel. Subsequent closure of the firing switch results in firing the round left in alignment with the upper barrel to again initiate the indexing cycle and continued operation of the gun. With each of the above-mentioned indexing cycles, the ejector systems operate to eject each empty cartridge case (or dud round if such were the case) from its firing chamber on the indexing cycle resulting from the firing thereof (or from the preceding firing in the case of two duds, or from operation of the chargers in the case of one dud), and the cooling systems operate to cool the thus emptied firing chambers by a blast of coolant fluid or gas upon the succeeding indexing cycle. From a consideration of this operational analysis together with previous descriptions made herein, the operation of the gun under the control of the cyclic rate timer or in the advent of a dud or misfire will be apparent to those skilled in the art.

Considering next in detail the time relationship of the various operations of the present gun, reference is had to the time chart of Fig. 37. This chart depicts the relative time relationships of the several operations during the cycling of the gun, starting with a single round firing from the upper barrel to initiate indexing action, followed by a two-round firing, one round from each barrel, and concluded by a single round firing from the bottom barrel to bring the indexing action and movement of the carriage to a halt. As there shown, the round aligned with the top barrel is fired, and immediately thereafter the projectile travels down the barrel initiating a recoil of the carriage together with the breech and both barrels. Shortly after the projectile leaves the barrel, the gas pressure is reduced, and after the initial straight portion of one of the U-shaped camming grooves has been traversed by its camming roller, breech rotation begins. Simultaneously with breech rotation feeding of the belted ammunition proceeds in synchronism therewith. Almost immediately after the rotational cycle commences the cooling systems operate to inject a coolant fluid into the empty firing chambers rotationally twice preceding the chamber which contained the round just fired and the chamber diametrically opposite therefrom. Upon the camming roller reaching the apex of the particular U-shaped camming groove in which it is operating, the recoil action of the carriage is changed into a counter-recoil motion, breech rotation, however, continuing in the same direction of rotation, ammunition belt feeding continuing in synchronism with the breech rotation, and the injection of coolant into the firing chambers aforementioned continuing. After counterrecoil action has started and a new pair of projector carried rounds have been brought into alignment with the rotationally second succeeding firing chambers from that in which the firing has just occurred and that chamber diametrically opposite therefrom, the projector firing shoes contact the projector firing pins. Almost immediately following this electrical contact the rounds contained in said projectors are blown into the appropriate firing chambers in the rotatable breech by the explosive force of the projector caps. After the indexing cycle has been almost completed and just before rotation of the breech as results therefrom has been completed, the ejector mechnisms each operate to expel a gas blast into the forward end of the firing chamber which contained the round just fired and the one diametrically opposite therefrom to eject the empty cartridge case contained in the first chamber, driving the same back into its original projector casing, the ejection of the case commencing shortly after the beginning of the ejector gas blast. Thus, there is accomplished one complete indexing cycle of the gun.

As the carriage approaches battery position it is moving forward with energy substantially equal to the initial recoil impulse of the one round fired. But shortly before the carriage reaches battery position and after rotation of the breech has stopped, two new rounds are aligned with the two barrels and are fired. The recoil impulse resulting from one of said rounds substantially counteracts the counterrecoil energy resulting from the single round previously fired, while the remaining recoil impulse of the firing drives the carriage, both barrels, and the rotatable breech into rearward recoil motion with the recoil impulse of substantially one round. The succession of operations resulting from the indexing cycle which follows are substantially identical in sequence and time relationships to that previously described for the first single round firing. On the counterrecoil stroke of the carriage after the indexing rotation of the breech has been completed and shortly before the carriage has returned to battery position, the firing switch 255 having in the meanwhile been opened, two new rounds are aligned with the two barrels but only the bottom one is fired, thus substantially counteracting the counterrecoil energy resulting from the previous firing to bring the indexing and counterrecoil action of the carriage and breech to a halt.

The foregoing time relationship description of the several operations during the cycling of the gun, although representing a particular case in its firing possibilities, is nevertheless applicable to all firing possibilities.

Although described as a two barrel gun, the present invention amy be readily modified, as will be apparent to those skilled in the art, to operate on any suitable number of barrels. A further modification of the present gun may be had to make the recoil action thereof gas assisted. Although when the present gun is constructed for smaller ammunition, the indexing action thereof is so rapid that the loading time becomes critical, but when designed for larger ammunition, the loading is easily effected while the indexing rate becomes the controlling factor. To increase the indexing rate, the barrels may be so designed as to assist the recoil impulse with the gas pressure developed from the firing of a round, as illustrated in Fig. 38. To this end, a barrel 310 is slidably seated in its gas tank sleeve 315 with a forward bushing 311 interposed therebetween. An annular channel 312, connecting gas bleed port 316 with the one-way ball check valve 128b, is delineated by the forward and rear shoulders 314 and 313, respectively, the forward shoulder being smaller than the rear shoulder to compensate for the thickness of the bushing 311. Therefore when a bullet is fired, as in the previous descriptions its recoil impulse drives the carriage, barrels, and breech rearwardly to initiate an indexing cycle, the gas thereby produced in the barrel being fed through valve 128b into tank 128 to maintain the pressure therein at a desired level. However, in the instant modification, when this gas pressure is applied in the annular channel 312, a greater force is exerted rearwardly against the larger rear shoulder 313 thereof than is exerted forwardly against the smaller forward shoulder 314, thereby increasing the recoil impulse and enhancing the speed of indexing. The foregoing description is therefore presented merely by way of example, and other modifications will be apparent. Such modifications as are within the spirit and scope of the present invention as defined by the appended claims are within the monopoly of this patent.

The invention described herein may be manufactured and used by or for the Government of the United States of America for governmental purposes without the payment of any royalties thereon or therefor.

What is claimed is:

1. In a gun comprising a cylindrical breech having a plurality of firing chambers axially aligned and radially disposed therein, a recoiling structure, and a linkage between said breech and said structure for effecting a predetermined degree of rotation of said breech in consequence of recoil action of said structure; an ammunition feeding means comprising a plurality of star wheels linked to said breech for corresponding rotation therewith and having the intertooth spaces thereof registered with said firing chambers, belted substantially tubular ammunition projectors cooperating with said star wheels, said projectors being closed at one end, designed to fit into the intertooth spaces of said star wheels, and having explosive primers at their closed ends, and a loading means comprising projector primer firing means cooperating with the rotation of said star wheels and the feeding of said projectors to fire said primers upon said projectors coming into alignment with a firing chamber of said breech, thereby loading rounds carried by said projectors into said firing chambers by explosive pressure.

2. In a gun comprising a rotatable breech having a plurality of firing chambers formed therein, a recoiling structure, and a linkage between said breech and said structure for effecting a predetermined degree of rotation of said breech in consequence of recoil action of said structure; an ammunition feeding means comprising a star wheel linked to said breech for corresponding rotation therewith and having the intertooth spaces thereof registered with said firing chambers, belted ammunition projectors cooperating with said star wheel and designed to fit into the intertooth spaces thereof, and explosive loading means for propelling rounds into said firing chambers upon said projectors coming into alignment therewith.

3. A rapid fire gun comprising a receiver casing, a frame member reciprocably mounted on said casing, a cylindrical breech rotatably mounted on said frame member and reciprocable therewith, said breech having a plurality of axially aligned and radially disposed firing chambers formed therein and a plurality of substantially U-shaped and elliptically contoured camming grooves formed on the exterior surface thereof, a pivot shaft medially supported by said casing, a yoke pivotally carried by said shaft medially of the ends of said yoke, a camming block guided by said frame member for reciprocable movement therealong, cam means pivotally mounted on said block for cooperation with said camming grooves, one end of said yoke being linked to said block and the other end thereof being linked to said frame member, two barrels carried by said frame member and aligned with two oppositely disposed firing chamber positions, ammunition feeding means linked to said breech and comprising a star wheel for unitary rotation therewith but relative reciprocation, belted ammunition projectors cooperating with said star wheel and having explosive primers therein, loading means comprising explosive primer firing means cooperating with the rotation of said star wheel and the feeding means, said feeding and loading means being affixed to said receiver casing and thus restrained against reciprocable movement with said breech and frame member, the firing of a round from a firing chamber thereby causing said frame member, barrels, and breech to recoil, the linkage between said frame member and said camming block through said pivotally mounted yoke and the cooperation between said cam means and said camming grooves causing an indexing cycle of said gun resulting in a recoil and counterrecoil reciprocation of said frame member, barrels, and breech and a rotation of said breech and ammunition feeding and loading mechanism, this indexing rotation of said breech bringing the next succeeding pair of oppositely disposed firing chambers into alignment with said barrels, said feeding and loading means being designed to move said belted ammunition into correspondence with said firing chambers as actuated by the indexing rotation of said breech, said loading means being adapted to load rounds into said firing chambers when in correspondence therewith and said firing means is rendered effective to fire said explosive primers, a firing control circuit, means included in said firing circuit for rendering said firing means effective, additional means included in said firing circuit for firing rounds on the counterrecoil strokes of said frame member thereby providing for the counteraction of counterrecoil energy by a subsequent recoil thrust, cartridge case and dud round ejector means including a pressure release valve operatively connected to and actuated by said frame member during the indexing cycle of said frame member for supplying a sufficient amount of pressure to eject fired cartridge cases and dud rounds from the firing chambers, cooling means including a supply device operatively connected to said frame member and actuated thereby during the indexing cycle of said frame member for injecting a coolant fluid into the firing chambers emptied by said ejector means, and charger means including an electrical operated device operatively connected to said frame member and controlled by said firing control circuit for initiating indexing action of said gun and for re-establishing indexing action thereof when the gun is in a state of rest.

4. A rapid fire gun comprising a receiver casing, a frame member reciprocably mounted on said casing, a breech rotatably mounted on said frame member and reciprocable therewith, said breech having a plurality of firing chambers formed therein and a plurality of camming grooves formed on the exterior surface thereof, a pivot shaft supported by said casing, a yoke pivotally carried by said shaft medially of the ends of said yoke, a camming block guided by said frame member for reciprocable movement therealong, cam means pivotally mounted on said block for cooperation with said camming grooves, one end of said yoke being linked to said block and the other end thereof being linked to said frame member, two barrels carried by said frame member and aligned with two firing chamber positions, ammunition feeding means linked to said breech and comprising a star wheel for unitary rotation therewith but relative reciprocation, belted ammunition projectors cooperating with said star wheel and having explosive primers therein, loading means comprising explosive primer firing means cooperating with the rotation of said star wheel and feeding means, said feeding and loading means being restrained against reciprocable movement with said breech and frame member, the firing of a round from a firing chamber thereby causing said frame member, barrels, and breech to recoil, the linkage between said frame member and said camming block through said pivotally mounted yoke and the cooperation between said cam means and said camming grooves causing an indexing cycle of said gun resulting in a recoil and counterrecoil reciprocation of said frame member, barrels, and breech and a rotation of said breech and ammunition feeding and loading mechanism, this indexing rotation of said breech bringing a succeeding pair of firing chambers into alignment with said barrels, said feeding means being designed to move said belted ammunition into corespondence with said firing chambers as actuated by the indexing rotation of said breech, said loading means being adapted to load rounds into said firing chambers by gas pressure when in correspondence therewith and said firing means is rendered effective to fire said explosive primers, a firing control circuit, means included in said firing circuit for rendering said firing means effective, additional means included in said firing circuit and operatively connected to the rounds when the rounds are loaded into said firing chambers for firing rounds on the counterrecoil strokes of said frame member thereby providing for the counteraction of recoil energy by a subsequent recoil thrust, cartridge case and dud round ejector means comprising a pressure release device operatively connected to and actuated by the frame member during the indexing cycle of said frame member for supplying a sufficient amount of pressure to eject fired cartridge cases or dud rounds from the firing chambers, cooling means including a coolant release device operatively connected to and actuated by said frame member during the indexing cycle of said frame member for injecting a coolant fluid into the firing chambers emptied by said ejector means, and charger means including an electrically operated valve operatively connected to said firing control circuit and rendered effective thereby for initiating indexing action of said gun and for re-establishing indexing action thereof when at rest.

5. A rapid fire gun camprising a receiver casing, a frame member reciprocably mounted on said casing, a breech rotatably mounted on said frame member and reciprocable therewith, said breech having a plurality of firing chambers formed therein and a plurality of camming grooves formed on the exterior surface thereof, a pivot shaft supported by said casing, a yoke pivotally carried by said shaft medially of the ends of said yoke, a camming block slidably supported on said frame member, cam means pivotally mounted on said camming block for cooperating with said camming grooves, one end of said yoke being linked to said block and the other end thereof being linked to said frame member, two barrels carried by said frame member and aligned with two firing chamber positions, ammunition feeding and loading means including a plurality of star wheels linked to said breech for unitary rotation therewith but relative reciprocation, belted ammunition projectors cooperating with said star wheels and having explosive primers therein, loading means comprising explosive primer firing means cooperating with the rotation of said star wheels and the feeding means, said feeding and loading means being restrained against reciprocable movement with said breech and frame member, a recoil thrust thereby causing said frame member, barrels, and breech to recoil, the linkage between said frame member and said camming block through said pivotally mounted yoke and the cooperation between said cam means and said camming grooves causing an indexing cycle of said gun resulting in a recoil and counterrecoil reciprocation of said frame member, barrels, and breech and a rotation of said breech and ammunition feeding and loading mechanism, this indexing action bringing a succeeding pair of firing chambers into alignment with said barrel, said feeding and loading means being designed to move belted ammunition into correspondence with said firing chambers as actuated by the indexing rotation of said breech, said loading means being adapted to load rounds into said firing chambers by gas pressure when in correspondence therewith and said firing means is rendered effective to fire said explosive primers, and a firing control circuit, means included in said circuit for rendering said firing means effective, and additional means included in said circuit and operatively connected to the rounds when the rounds are loaded into said firing chambers for firing rounds on the counterrecoil strokes of said frame member, thereby providing for the counteraction of recoil energy by a subsequent counterrecoil thrust.

6. A rapid fire gun comprising a receiver casing, a frame member reciprocably mounted on said casing, a breech rotatably mounted on said frame member and reciprocable therewith, said breech having a plurality of firing chambers formed therein and a plurality of camming grooves formed on the exterior surface thereof, a pivot shaft supported by said casing, a yoke pivotally carried by said shaft medially of the ends of said yoke, a camming block slidably supported on said frame member, cam means pivotally mounted on said block for cooperating with said camming grooves, one end of said yoke being linked to said block and the other end thereof being linked to said frame member, two barrels carried by said frame member and aligned with two firing chamber positions, ammunition feeding means including a plurality of star wheels linked to said breech for unitary rotation therewith but relative reciprocation, belted ammunition projectors cooperating with said star wheels and having explosive primers therein, loading means comprising explosive primer firing means cooperating with the rotation of said star wheels and the feeding means, said feeding and loading means being restrained against reciprocable movement with said breech and frame member, a recoil thrust thereby causing said frame member, barrels, and breech to recoil, the linkage between said frame member and said camming block through said pivotally mounted yoke and the cooperation between said camming block and said camming grooves causing an indexing cycle of said gun resulting in a recoil and counterrecoil reciprocation of said frame member, barrels, and breech and a rotation of said breech and ammunition feeding and loading mechanism, this indexing action bringing another pair of firing chambers into alignment with said barrels, said feeding and loading means being designed to move said belted ammunition into correspondence with said firing chambers as actuated by the indexing rotation of said breech, said loading means being adapted to load rounds into said firing chambers when in correspondence therewith and said firing means is rendered effective to fire said explosive primers, firing control circuit, means included in said firing control circuit for rendering said firing means effective, and means included in said firing control circuit and operatively connected to rounds when the rounds are loaded into said firing chambers for firing rounds on the counterrecoil strokes of said frame member, thereby providing for the counteraction of counterrecoil energy by a subsequent recoil thrust.

7. A rapid fire gun comprising a receiver casing, a frame member reciprocably mounted on said casing, a breech rotatably mounted on said frame member and reciprocable therewith, said breech having a plurality of firing chambers formed therein and a plurality of camming grooves formed on the exterior surface thereof, a pivot shaft supported by said casing, a yoke pivotally carried by said shaft medially of the ends of said yoke, a camming block slidably supported on said frame member, cam means pivotally mounted on said block for cooperating with said camming grooves, one end of said yoke being linked to said block and the other end thereof being linked to said frame member, two barrels carried by said frame member and aligned with two firing chamber positions, and ammunition feeding means comprising a plurality of star wheels linked to said breech for operation therewith and having intertooth spaces thereof registered with said firing chambers, belted substantially tubular ammunition projectors cooperating with said star wheels and having explosive primers disposed in one end thereof, loading means comprising projector primer firing means cooperating with the rotation of said star wheels and the feeding of said projectors to fire the primers upon said projectors coming in alignment with a firing chamber of said breech, a recoil thrust thereby causing said frame member, barrels, and breech to recoil, the linkage between said frame member and said camming block through said pivotally mounted yoke and the cooperation between said camming block and said camming grooves causing an indexing cycle of said gun, resulting in a recoil and counterrecoil travel of said frame member, barrels, and breech, a rotation of said breech, and operation of said ammunition feeding and loading means, this indexing action bringing another pair of firing chambers into alignment with said barrels and enabling the counteraction of counterrecoil energy by a subsequent recoil thrust.

8. A rapid fire gun comprising a gun mounting means, a frame member reciprocably mounted thereon, a breech rotatably mounted on said frame member and reciprocable therewith, said breech having firing chambers formed therein and two groups of camming grooves formed on the exterior surface thereof, a barrel carried by said frame member and movable therewith, a pivot shaft supported by said mounting means, a pivotable element carried by said shaft medially of the ends of said element, a camming block slidably supported on said frame member, a pair of mutually spaced cam devices pivotally mounted on said block, one of said cam devices cooperating with one group of the camming grooves for rotating said breech and aligning a firing chamber with said barrel, the other cam device cooperating with the other group of camming grooves for rotating the breech and aligning another firing chamber with said barrel, one end of said member being linked to said block and the other end thereof being linked to said frame member, a barrel carried by said frame member and aligned with a firing chamber position, ammunition feeding means comprising star wheels linked to said breech for operation therewith and having the intertooth spaces thereof in registration with said firing chambers, the linkage between said frame member and said camming block through said pivotable member and the cooperation between said cam devices and said camming groove causing reciprocation of said frame member, barrel, and said rotation of the breech, belted ammunition projectors cooperating with said star wheels and adapted to fit into the intertooth spaces thereof, and explosive loading means cooperating with said star wheels for propelling rounds into said firing chambers as said projectors are brought into alignment therewith and with said barrel.

9. A rapid fire gun comprising a frame member mounted for linear reciprocatory movement, a casing enclosing said frame member, a cylindrical breech rotatably carried by said frame member and reciprocable therewith having a plurality of firing chambers formed therein and a plurality of substantially U-shaped camming grooves formed on the outer surface thereof, a pivotal yoke mounted medially of the ends thereof, a block carried by said frame member for linear reciprocatory motion thereon, cam means pivotally mounted on said block and cooperating with said camming grooves in a manner to cause rotation of said breech, one end of said yoke being linked to said block and the other end thereof being linked to said frame member thereby providing for oppositely directed linear motions of said block and frame member, a recoil impulse causing an indexing cycle of said gun, this cycle comprising a recoil movement of said frame member and rotation of said breech as accomplished by the linkage between said frame member and said block through said pivotally mounted yoke and the cooperation between said cam means and said substantially U-shaped camming grooves, and breech rotation in turn camming said frame member into counterrecoil movement through said block and linkage and bringing the next succeeding firing chamber into firing position, means including a plurality of star wheels interlocked with said breech for corresponding rotation therewith for feeding belted ammunition projectors into alignment with said firing chambers, explosive loading means cooperating with the rotation of said star wheels and feeding means for propelling rounds into said firing chambers when in alignment therewith, thereby enabling the counteraction of recoil energy by a subsequent counterrecoil impulse, and means on said casing cooperating with complementary means on said loading means for rendering said loading means effective to propel rounds into the firing chamber.

10. A gun comprising a frame member mounted for linear reciprocatory movement, a cylindrical breech rotatably carried by said frame member and reciprocable therewith having a plurality of firing chambers formed therein and a camming groove formed on the outer surface thereof, a pivotal member mounted medially of the ends thereof, a camming block slidably arranged on said frame member and having cam means pivotally mounted thereon for cooperating with said camming groove, one end of said pivotal member being linked to said camming block and the other end thereof being linked to said frame member, a recoil impulse causing an indexing cycle of said gun, this cycle comprising a linear recoil movement of said frame member and rotation of said breech as accomplished by the linkage between said frame member and said camming block through said pivotally mounted member and the cooperation between said cam means and said camming groove, and breech rotation in turn camming said frame member into counterrecoil movement through said block and linkage and bringing a succeeding firing chamber into firing position, belted substantially tubular ammunition projectors adapted to be fed into alignment with said firing chambers and having explosive primers disposed therein, means including a plurality of star wheels interlocked with said breech for corresponding operation therewith and for feeding said ammunition into alignment with said firing chambers, and loading means comprising projector primer firing means cooperating with the rotation of said star wheels for propelling rounds carried by said projectors into said firing chambers by explosive force when the projectors are in alignment with the firing chambers and the primers are fired.

11. A recoil counteracting means for guns comprising a reciprocatory recoiling frame member enclosed in a fixed casing, a rotatable breech carried by said structure for reciprocatory movement therewith and having a plurality substantially U-shaped camming grooves formed on the peripheral surface thereof, a yoke pivotally mounted on said casing, a camming block mounted on said frame member and guided thereby for reciprocatory movement, cam means pivotally mounted on the camming block engaging and cooperating with said camming grooves for rotating said breech as the block is moved in a direction of movement of the frame member, a link member pivotally connecting said yoke and said camming block and actuated as the yoke is moved in response to reciprocatory movement of said frame member for causing oppositely directed reciprocatory movement of said block, the cooperation between said frame member and said camming block through said link member and the cooperation between said cam means and said breech through said camming grooves resulting in the translation of a rearward recoil thrust of said frame member into a rotary thrust of said breech and a further translation of said rotary thrust into a forwardly directed counterrecoil thrust of said frame member, thereby enabling the counteraction of the counterrecoil energy of one firing of said gun by the recoil impulse of a subsequent firing thereof.

12. A recoil counteracting means for guns comprising a reciprocatory recoiling frame member enclosed in a fixed casing, a rotatable cylinder carried by said frame member for reciprocatory movement therewith and having a plurality of camming grooves formed on the peripheral surface thereof, an element pivotally mounted on said casing, a camming block mounted on said frame member and guided thereby for reciprocatory movement, cam means pivotally mounted on said block engaging and cooperating with said camming grooves for rotating said cylinder as the block is moved in a direction oppositely to the direction of movement of said frame member, and a link pivotally connected to said element and said camming block and actuated by said element in response to reciprocatory movement of said frame member for causing oppositely directed reciprocatory movement of said block with respect to the direction of movement of said frame member, the cooperation between said frame member and said camming block through said link and the cooperation between said cam means and said cylinder through said camming grooves resulting in the translation of rearward recoil thrust of said frame member into a rotary thrust of said cylinder and a further translation of said rotary thrust into a forwardly directed counterrecoil thrust of said frame member, thereby enabling the counteraction of the recoil energy of one firing of said gun by the counterrecoil impulse of a subsequent firing thereof.

13. A recoil counteracting means for guns comprising a recoiling gun structure, a breech cooperating with said structure and rotatably mounted thereon, a camming block slidably disposed on said structure, and cam means pivotally mounted on said block and cooperating with said breech and block, said camming block and cam means undergoing relative movement during recoiling movement of said structure for rotating said breech, the cooperation between said camming block and said cam resulting in the translation of a rearwardly directed recoil thrust of said structure into a forwardly directed counterrecoil thrust thereof, thereby enabling the counteraction of the recoil energy of one firing by the counterrecoil impulse of a subsequent firing.

14. A recoil counteracting means for guns comprising a recoiling gun structure, a breech cooperating with said structure and rotatably mounted thereon, a camming block slidably arranged on said structure, a rocker arm pivotally mounted on said block, and a cam movably disposed on each end of said rocker arm and cooperating with said breech and said camming block and undergoing relative movement during recoiling movement of said structure for rotating said breech, said camming block and cams cooperating with said structure to cause the translation of a rearwardly directed recoil thrust of said structure into a forwardly directed counterrecoil thrust thereof thereby enabling the counteraction of the recoil energy of one firing by the counterrecoil impulse of a subsequent firing.

15. In a gun comprising a rotatable breech having a plurality of firing chambers formed therein, a recoiling structure, a casing enclosing said structure and fixed with respect thereto, and a linkage between said breech and said structure for effecting a predetermined degree of rotation of said breech in consequence of recoil action of said structure; an ammunition feeding means comprising a star wheel linked to said breech for corresponding rotation therewith and having the intertooth spaces thereof registered with said firing chambers, belted ammunition projectors cooperating with said star wheel and designed to fit into the intertooth spaces thereof, fluid pressure loading means for propelling rounds into said firing chambers upon said projectors coming into alignment therewith, means on said star wheel cooperating with complementary means on said casing for rendering said pressure means effective when said projectors are in alignment with said firing chambers, and means on said structure cooperating with additional complementary means on said casing for causing rounds of the projectors to be fired from said firing chambers.

16. In a gun comprising a movable breech having a plurality of firing chambers formed therein, a recoiling structure, a casing enclosing said structure and fixed with respect thereto, and means pivotally mounted on said casing and having one end thereof connected to said structure and the other end thereof linked to said breech for effecting a predetermined degree of movement of said breech in consequence of recoil action of said structure; an ammunition feeding means comprising a toothed means linked to and actuated in correspondence with said breech and having its intertooth spaces registered with said firing chambers, belted ammunition projectors cooperating with said toothed means to feed rounds into alignment with said firing chambers, and loading means for projecting said rounds into said chambers in a firing position upon their coming into alignment therewith and said loading means is rendered effective, and means including an element carried by said casing for engagement with complementary means on said feeding means for rendering said loading means effective when said rounds are in said firing position.

17. In a gun comprising a movable breech having a plurality of firing chambers formed therein, a recoiling structure, means connected to said breech and the structure for effecting a predetermined degree of movement of said breech in consequence of recoil action of said structure, feeding means connected to said breech and actuated by and in correspondence with movement of said breech, belted ammunition projectors cooperating with said feeding means and fed into alignment with said firing chambers thereby, and means including an explosive firing element on said feeding means for propelling rounds carried by the projectors into said chambers upon their coming into alignment therewith as said explosive firing element is rendered effective, and means cooperating with said explosive firing element for rendering the element effective when said projectors are in alignment with the chambers.

18. In a gun comprising a movable breech having a plurality of firing chambers formed therein, a recoiling structure, and a linkage between said breech and said structure for effecting a predetermined degree of movement of said breech in consequence of recoil action of said structure; means including a star wheel connected to and actuated by breech movement for feeding ammunition projectors having rounds therein into alignment with said firing chambers, expanding pressure means connected to and operated by said structure for propelling rounds carried by said projectors into said chambers as the projectors are aligned with said chambers and said pressure means is rendered operable, and means including an actuating member carried by said star wheel for rendering said pressure means operable when the projectors are aligned with the chambers.

19. In combination with an automatic gun having means operating to feed ammunition projectors having rounds therein into alignment with a firing chamber, an explosive loading means cooperating with said feeding means for propelling rounds of the projectors into said chamber as the explosive means is rendered effective, actuating means on said feeding means and operable when a projector is in alignment with said chamber, and firing means including complementary means in engagement with and cooperating with the actuating means for rendering said explosive loading means effective upon alignment of a projector with said chamber.

20. In combination with an automatic gun having means operating to feed ammunition into alignment with a firing chamber, a casing for the gun, an explosive pressure loading means cooperating with the feeding means for propelling rounds of ammunition into said chamber in response to a predetermined pressure generated thereby as the loading means is fired, and means including an element carried by said casing in engagement therewith and controlled by the ammunition feed to trigger said loading means upon alignment of rounds with said chamber.

21. A gun loading means comprising a projector for housing a round of ammunition, means controlled by gun operation for bringing the projector into a gun loading position, an explosive primer positioned at one end of said projector for propelling said round from said projector as said primer is fired, firing means including a primer firing element carried by said loading means in engagement with and controlled by said gun operation to fire said primer upon said projector housed round coming into gun loading position, and means connected to the firing means for rendering said primer firing element effective to fire said primer when said projector is aligned with a firing chamber.

22. A gun comprising a recoiling structure including a barrel, a rotatable firing chamber member carried by said structure having a plurality of firing chambers formed therein, a camming groove formed on the exterior surface of said member, a block linked to said structure for oppositely directed movement with respect to the direction of movement of said structure during recoiling action of said structure, cam means pivotally mounted on said block and positioned to cooperate with said camming groove, the cooperation between said structure and said block causing said oppositely directed movement between said structure and said block and the cooperation between said cam means and said camming groove causing the chamber member to rotate a desired degree thereby enabling the alignment of successive firing chambers with the barrel of the gun as a result of successive firings thereof and recoiling actions of said structure.

23. In a recoil operated automatic gun comprising a recoiling structure, a breech rotatably mounted on said structure and carried for corresponding recoiling movement therewith, a camming groove formed on the surface of said breech, said breech having a plurality of firing chambers formed internally thereof adapted to be rotated to a firing position, a camming block slidably arranged on said structure and having cam means pivotally mounted thereon and cooperating with said groove during recoiling action of said structure for rotating said breech during recoiling movement of the gun and structure, and ammunition feeding means actuated by the rotary motion of said breech for feeding ammunition into alignment with said firing chambers, a fired cartridge case ejecting means including a pressure release device carried by said structure and controlled by the recoiling movement of said structure for releasing a sufficient amount of pressure to eject said case from the firing chambers after said ammunition has been fired and said breech is rotated past said firing position, a firing chamber cooling means including a coolant supply device operatively connected to and controlled by the recoiling movement of said structure for releasing a sufficient amount of coolant to cool said chambers after the breech has been rotated past the firing position and said case is ejected from said chambers, a charger means including an initially closed pressure release valve operatively connected to said structure for releasing a sufficient amount of pressure to apply a recoiling thrust to said structure when said structure is in a state of rest and the pressure release valve is actuated from said initially closed position to an open position, and means cooperating with said valve for actuating the valve from said initially closed position to said open position.

24. In a recoil operated automatic gun comprising a recoiling structure, a breech movably mounted on said structure for corresponding recoiling movement therewith, a camming means for moving said breech as a result of each recoiling action of said structure, said breech having a plurality of firing chambers formed internally thereof, and ammunition feeding means actuated by the motion of said breech for feeding ammunition into alignment with said firing chambers, ammunition loading means cooperating with said feeding means for loading rounds into said firing chambers, a fired cartridge casing and dud round ejecting means including an initially closed pressure supply device, means connected to said structure and controlled by the gun recoil action for actuating said pressure supply device to an open position whereby a sufficient amount of pressure is directed against said fired cartridge or said dud round to eject the latter from the firing chambers, a firing chamber cooling means including an initially closed coolant supply device, means connected to said structure and controlled by the gun recoil action for actuating said coolant supply device to an open position whereby a sufficient amount of coolant enters and cools said chambers, and a charger means including an electrically controlled pressure release valve cooperating with said structure and operable to release a sufficient amount of pressure to initiate a recoiling thrust to said structure when the structure is in a state of rest.

References Cited in the file of this patent
UNITED STATES PATENTS 448,841     Ritter et al. _____ Mar. 24, 1891

(Other references on following page)

UNITED STATES PATENTS

| Number | Name | Date |
|---|---|---|
| 698,472 | Driggs | Apr. 29, 1902 |
| 794,852 | Clarke | July 18, 1905 |
| 946,351 | Haeghen | Jan. 11, 1910 |
| 1,072,350 | Muller | Sept. 2, 1913 |
| 1,297,699 | Krzyzanowski | Mar. 18, 1919 |
| 1,298,091 | Redpath et al. | Mar. 25, 1919 |
| 1,304,583 | McClain | May 27, 1919 |
| 1,332,060 | Pacilli | Feb. 24, 1920 |
| 1,342,358 | Storle | June 1, 1920 |
| 1,347,803 | Bourdelles | July 27, 1920 |
| 1,399,119 | Hodges | Dec. 6, 1921 |
| 1,424,751 | Bangerter | Aug. 8, 1922 |
| 1,749,137 | Hudson | Mar. 4, 1930 |
| 1,787,939 | Ellis | Jan. 6, 1931 |
| 2,112,853 | Lucht et al. | Apr. 5, 1938 |
| 2,167,495 | Wimmersperg | July 25, 1939 |
| 2,186,969 | Green | Jan. 16, 1940 |
| 2,249,310 | Braun et al. | July 15, 1941 |
| 2,313,030 | Tauschek | Mar. 2, 1943 |
| 2,466,929 | Catlin | Apr. 12, 1949 |

FOREIGN PATENTS

| Number | Country | Date |
|---|---|---|
| 483 of 1890 | Great Britain | Dec. 27, 1890 |
| 13,504 of 1891 | Great Britain | July 9, 1892 |
| 229,759 | Germany | Jan. 10, 1911 |
| 585,851 | Germany | Oct. 11, 1933 |
| 687,060 | Germany | Jan. 22, 1940 |
| 577,338 | Great Britain | May 14, 1946 |
| 69,428 | Denmark | June 20, 1949 |